(12) United States Patent
Barbalho et al.

(10) Patent No.: US 11,301,395 B2
(45) Date of Patent: Apr. 12, 2022

(54) METHOD AND APPARATUS FOR CHARACTERIZING WORKLOAD SEQUENTIALITY FOR CACHE POLICY OPTIMIZATION

(71) Applicant: EMC IP HOLDING COMPANY LLC, Hopkinton, MA (US)

(72) Inventors: Hugo de Oliveira Barbalho, Rio de Janeiro (BR); Vinícius Michel Gottin, Rio de Janeiro (BR); Rômulo Teixeira de Abreu Pinho, Niterói (BR)

(73) Assignee: Dell Products, L.P., Hopkinton, MA (US)

(*) Notice: Subject to any disclaimer, the term of this patent is extended or adjusted under 35 U.S.C. 154(b) by 397 days.

(21) Appl. No.: 16/678,197

(22) Filed: Nov. 8, 2019

(65) Prior Publication Data

US 2021/0141738 A1   May 13, 2021

(51) Int. Cl.
*G06F 12/00* (2006.01)
*G06F 12/122* (2016.01)
*G06F 16/23* (2019.01)
*G06F 16/21* (2019.01)
*G06F 3/06* (2006.01)

(52) U.S. Cl.
CPC .......... *G06F 12/122* (2013.01); *G06F 3/061* (2013.01); *G06F 3/0659* (2013.01); *G06F 3/0688* (2013.01); *G06F 16/212* (2019.01); *G06F 16/2379* (2019.01)

(58) Field of Classification Search
CPC .. G06F 12/122; G06F 16/2379; G06F 16/212; G06F 3/061; G06F 3/0659; G06F 3/0688
See application file for complete search history.

(56) References Cited

U.S. PATENT DOCUMENTS 6,260,115 B1 * 7/2001 Permut ............... G06F 12/0862
                                                                  711/134
8,667,224 B1    3/2014 Yu et al.
2003/0217230 A1 * 11/2003 Rodriguez ............ G06F 12/127
                                                                  711/E12.076

* cited by examiner

*Primary Examiner* — Gurtej Bansal
(74) *Attorney, Agent, or Firm* — Anderson Gorecki LLP

(57) ABSTRACT

A method for characterizing workload sequentiality for cache policy optimization includes maintaining an IO trace data structure having a rolling window of IO traces describing access operations on addresses of a storage volume. A page count data structure is maintained that includes a list of all of the addresses of the storage volume referenced by the IO traces in the IO trace data structure. A list of sequences data structure is maintained that contains a list of all sequences of the addresses of the storage volume that were accessed by the IO traces in the IO trace data structure. A sequence lengths data structure is used to correlate each sequence in the list of sequences data structure with a length of the sequence, and a histogram data structure is used to correlate sequence lengths and a number of how many of sequences of each length are maintained in the sequence lengths data structure.

19 Claims, 16 Drawing Sheets

Rolling Time Window Sequence Lengths Histogram

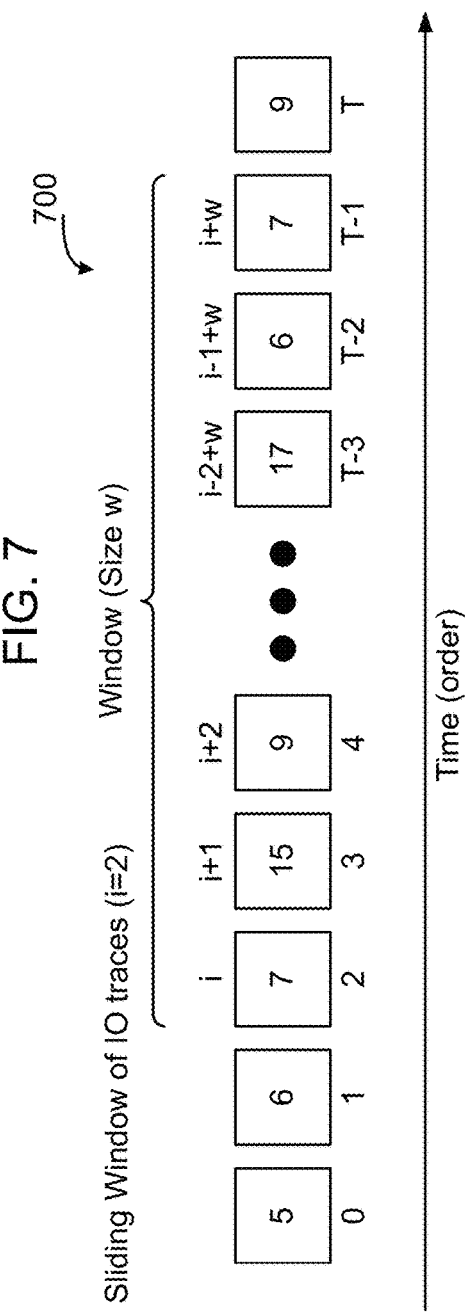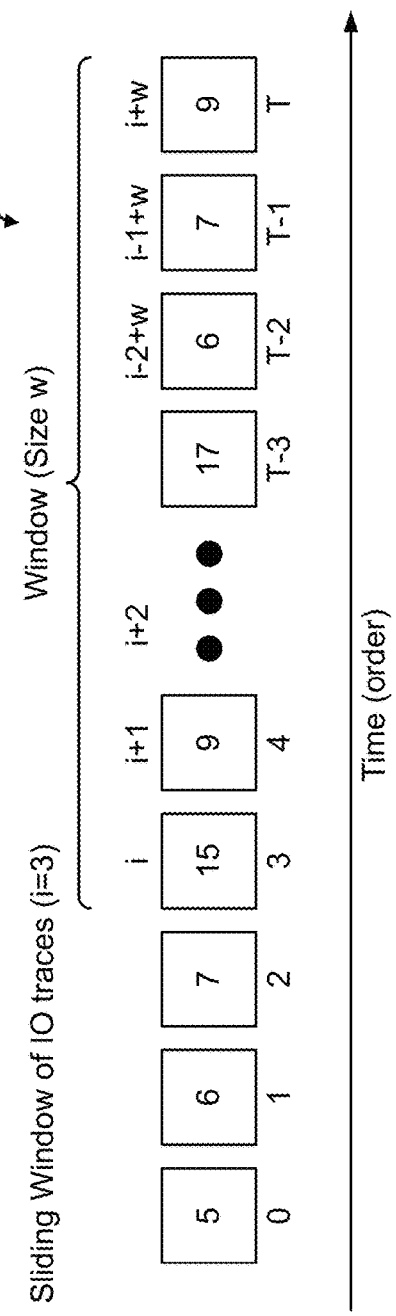

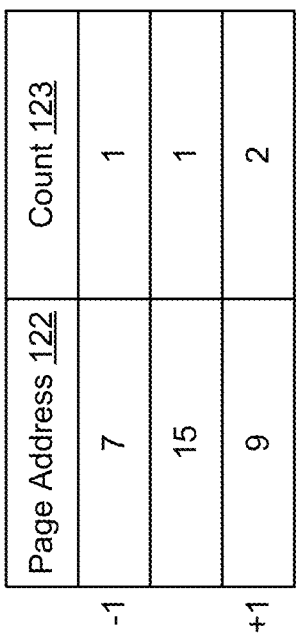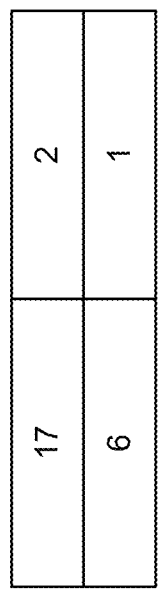
FIG. 9
Page Count data structure (i=2)
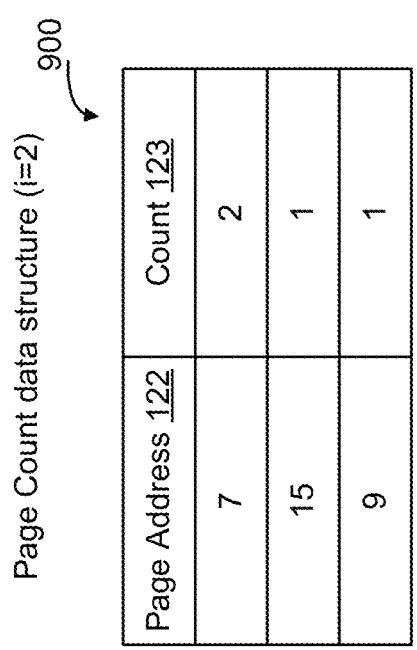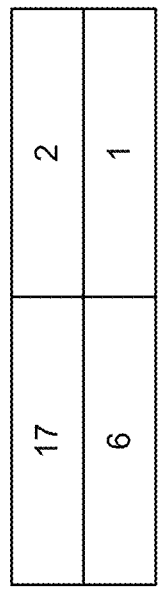
FIG. 10
Page Count data structure (i=3)

| Case | Sequence Lengths data structure 1200 | | | | Histogram data structure 1250 | | | |
|---|---|---|---|---|---|---|---|---|
| | Before Removal | | After Removal | | Before Removal | | After Removal | |
| | Head | Length | Head | Length | Length | Count | Length | Count |
| I | 7 | 3 | 7 | 1 | ◇3 | 1 | ◇3 | 0 |
| | 13 | 1 | 13 | 1 | ◇1 | 1 | ◇1 | 3 |
| | | | 10 | 1 | | | | |
| II | 8 | 3 | 8 | 2 | ◇3 | 1 | ◇3 | 0 |
| | 13 | 1 | 13 | 1 | ◇1 | 1 | ◇1 | 1 |
| | | | | | | | ◇2 | 1 |

| Case | Sequence Lengths Data Structures 1200 | | | | Histogram Data Structures 1250 | | | |
|---|---|---|---|---|---|---|---|---|
| | Before Insertion | | After Insertion | | Before Insertion | | After Insertion | |
| | Head | Length | Head | Length | Length | Count | Length | Count |
| I | 7 | 1 | 7 | 1 | 1 | 1 | 1 | 2 |
| | 13 | 2 | 13 | 2 | 2 | 1 | 2 | 1 |
| | | | 10 | 1 | | | | |
| II | 9 | 1 | 9 | 4 | 1 | 1 | 1 | 0 |
| | 13 | 2 | | | 2 | 1 | 2 | 0 |
| | | | | | | | 4 | 1 |
| III | 9 | 1 | 9 | 2 | 1 | 1 | 1 | 0 |
| | 13 | 2 | 13 | 2 | 2 | 1 | 2 | 2 |
| IV | 9 | 1 | 9 | 1 | 1 | 1 | 1 | 1 |
| | 13 | 2 | 12 | 3 | 2 | 1 | 2 | 0 |
| | | | | | | | 4 | 1 |

METHOD AND APPARATUS FOR CHARACTERIZING WORKLOAD SEQUENTIALITY FOR CACHE POLICY OPTIMIZATION

BACKGROUND

This disclosure relates to computing systems and related devices and methods, and, more particularly, to a method and apparatus for characterizing workload sequentiality for cache policy optimization.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method for characterizing workload sequentiality for cache policy optimization includes maintaining an IO trace data structure having a rolling window of IO traces describing access operations on addresses of a storage volume. A page count data structure is maintained that includes a list of all of the addresses of the storage volume referenced by the IO traces in the IO trace data structure. A list of sequences data structure is maintained that contains a list of all sequences of the addresses of the storage volume that were accessed by the IO traces in the IO trace data structure. A sequence lengths data structure is used to correlate each sequence in the list of sequences data structure with a length of the sequence, and a histogram data structure is used to correlate sequence lengths and a number of how many of sequences of each length are maintained in the sequence lengths data structure.

BRIEF DESCRIPTION OF THE DRAWINGS

FIGS. 7 and 8 are a functional block diagrams of workloads contained in a workload IO trace data structure, at time (i=2 and i=3).

FIG. 9 is a functional block diagram representation of a page count data structure correlating a page count with a number of instances that the page appears in the workload within the sliding window. The numbers included in the example page count data structure shown in FIG. 8 correlate to the example sliding window of IO traces shown in the workload of FIG. 7 at time (i=2).

FIG. 10 is a functional block diagram representation of an updated version of the page count data structure of FIG. 9. The numbers included in the updated example page count data structure shown in FIG. 10 correlate to the example sliding window of IO traces shown in the workload of FIG. 8 at time (i=3).

FIG. 12 is a functional block diagram of a sequence lengths data structure and a histogram data structure showing two examples of how the sequence lengths data structure and histogram data structure change with removal of an address from the sliding window of IO traces. The numbers included in the data structures shown in FIG. 12 correlate to the example sequences included in the list of sequences data structure shown in FIG. 11.

FIG. 15 is functional block diagram of the sequence lengths data structure and the histogram data structure showing four examples of how the sequence lengths data structure and histogram data structure change with insertion of an address into the sliding window of IO traces. The numbers included in the data structures shown in FIG. 15 correlate to the example sequences included in the list of sequences data structure shown in the examples contained in FIGS. 13 and 14.

DETAILED DESCRIPTION

Figure 1:
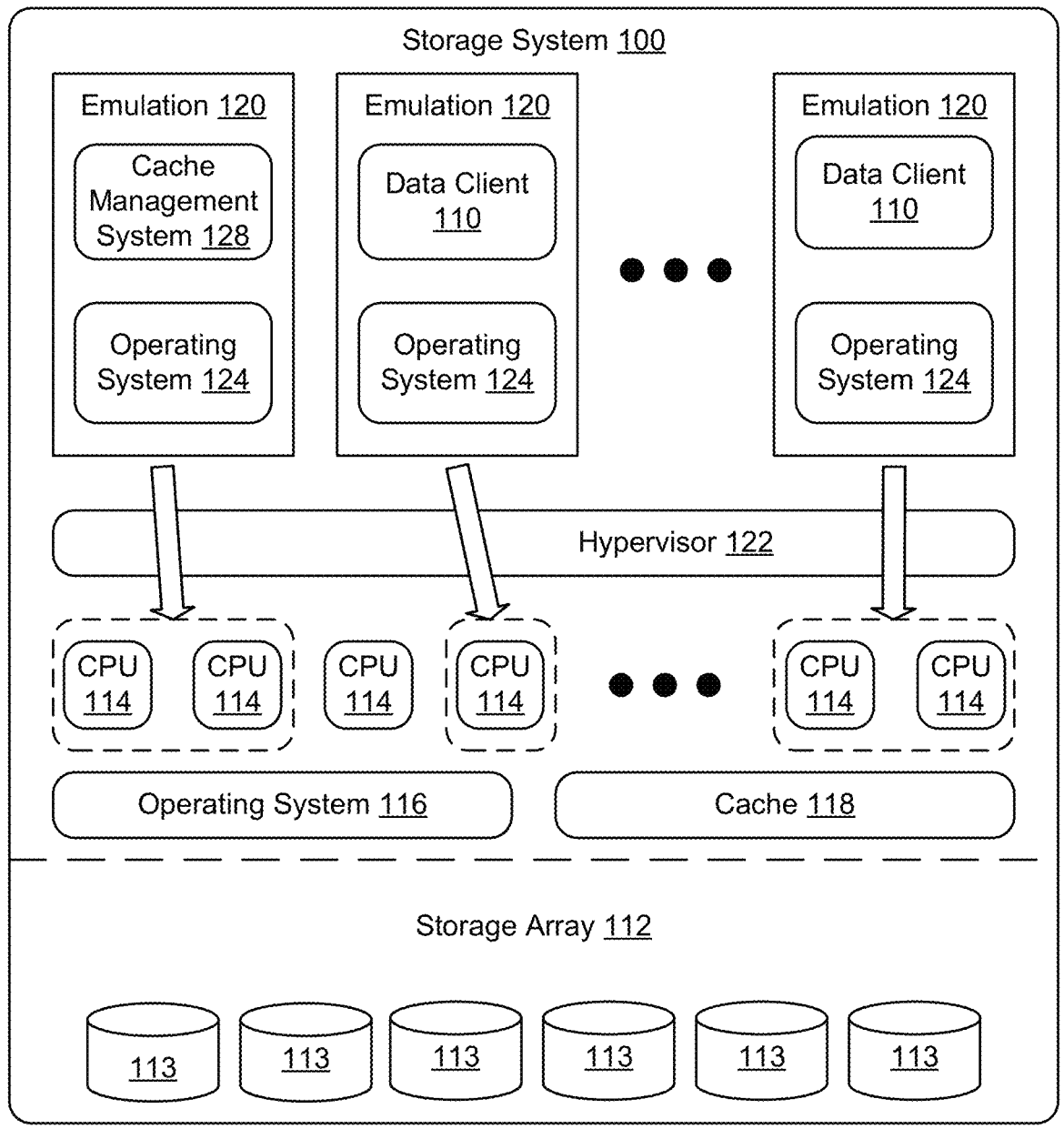
FIG. 1 is a functional block diagram of an example storage system configured according to some embodiments.

FIG. 1 is a functional block diagram of an example storage system 100, in which data clients 110 have access to storage resources provided by a storage array 112. As shown in FIG. 1, in some embodiments the storage system 100 has physical resources including a number of CPU processor cores 114, operating system 116, cache 118, and other physical resources.

Storage array 112 may be implemented using numerous physical drives using different types of memory technologies. In some embodiments the drives used to implement storage array 112 are implemented using Non-Volatile Memory (NVM) media technologies, such as NAND-based flash, or higher-performing Storage Class Memory (SCM) media technologies, such as 3D XPoint and Resistive RAM (ReRAM). Storage array 112 may be directly connected to the other components of the storage system 100 or may be connected to the other components of the storage system 100, for example, by an InfiniBand (IB) bus or fabric.

Data clients 110 act as hosts and provide access to the storage resources provided by storage array 112. In some embodiments, data clients 110 execute in emulations 120 instantiated in the context of the storage system 100. In some embodiments, a hypervisor 122 abstracts the physical resources of the storage system 100 from emulations 120, and allocates physical resources of storage system 100 for use by the emulations 120. Each emulation 120 has an emulation operating system 122 and one or more application processes running in the context of the emulation operating system 122.

Figure 2:
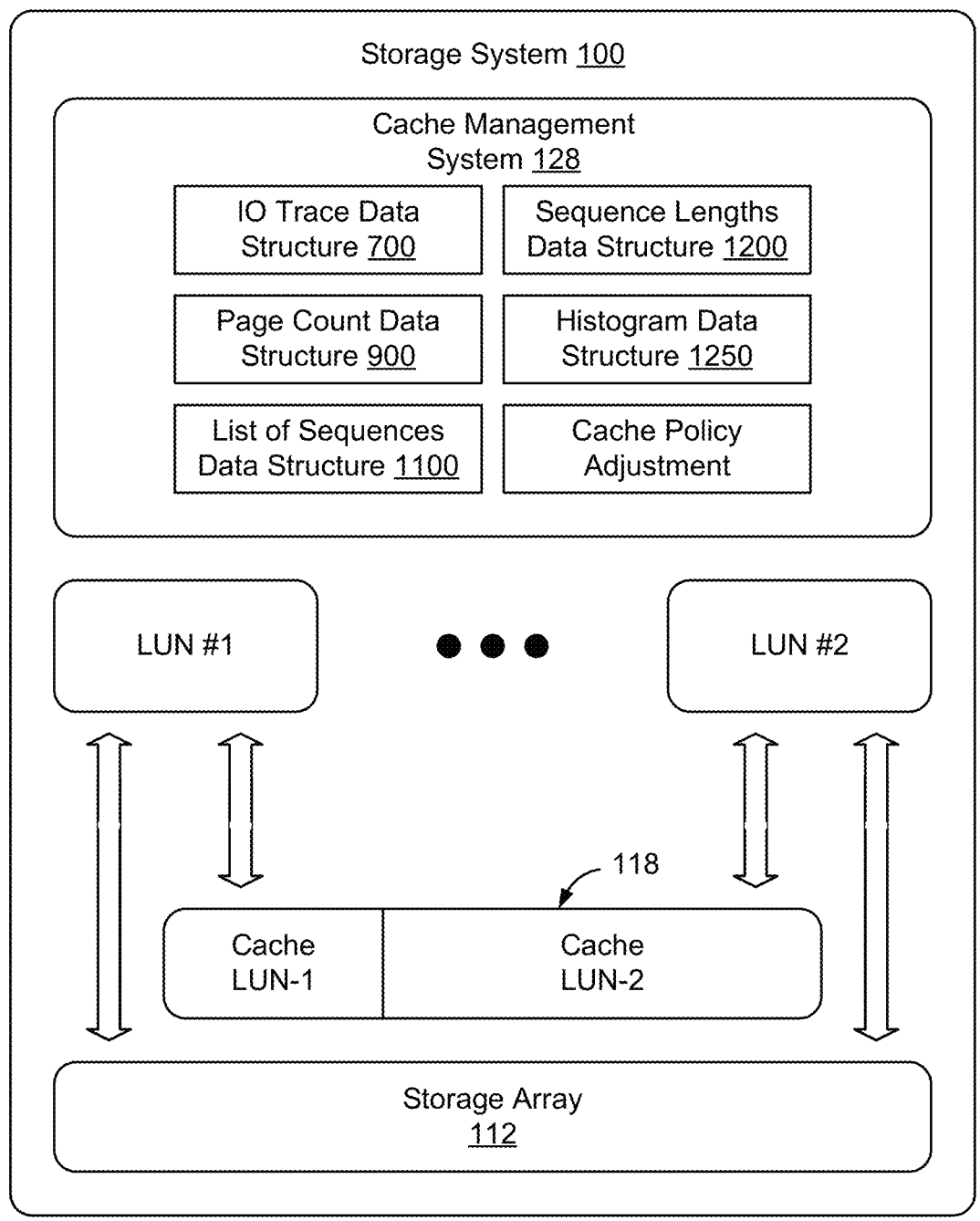
FIG. 2 is a functional block diagram of an example storage system showing the cache management aspects in greater detail, according to some embodiments.
Figure 3:
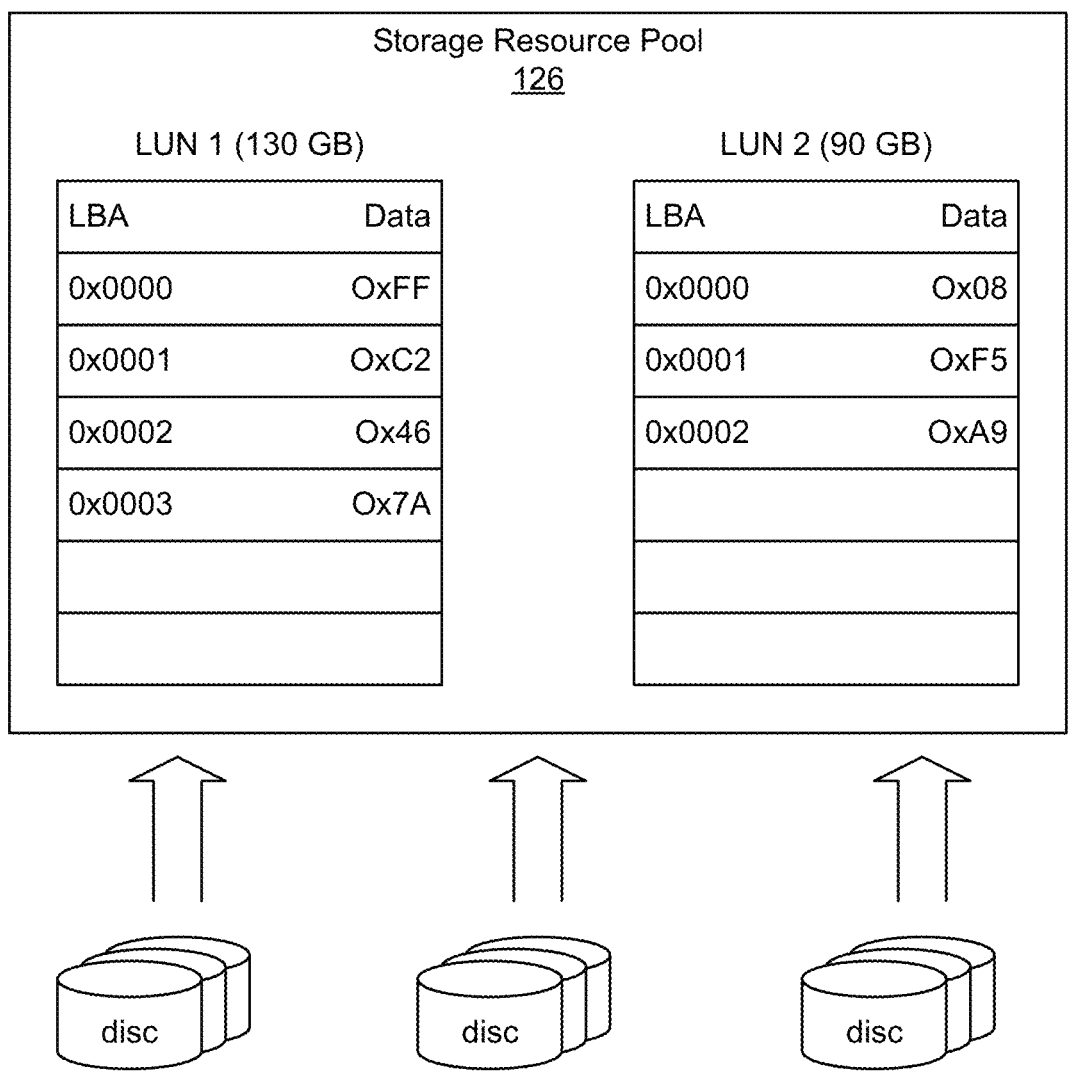
FIG. 3 is a functional block diagram of a portion of an example storage system's logical address space, according to some embodiments.

FIG. 2 is a functional block diagram of an example storage system showing aspects of the storage system 100 associated with cache management, in greater detail according to some embodiments. As shown in FIG. 2, the storage system has data clients 110 that perform memory access operations on the storage resources of the storage array 112. As shown in FIG. 3, the storage resources of the storage array 112, in some embodiments, are presented as logical units (LUNs) to the data clients 110. For example, as shown in FIG. 3, a group of storage resources of the storage array 112 may be grouped into a storage resource pool 126. LUNs implemented as separately addressable logical volumes are then created and associated with the storage resource pool 126.

FIG. 2 is a functional block diagram of an example storage system 100, such as the storage system 100 of FIG. 1. Data associated with data client 110 is stored in one or more user filesystems, and each user file system is stored in a separate logical storage volume, referred to herein as a Logical Unit (LUN). A LUN is a logical construct which enables the physical storage resources 110, 112 to be abstracted from the data client 110. The logical storage volume in some instances is referred to as "thin" if actual physical storage resources of storage array 112 are only allocated by the storage system 100 to the TLU when used. Thus, if a LUN is thin, the amount of physical storage resources allocated to a LUN will increase and decrease over time as the file system stored on the LUN increases and decreases in size.

Resources meant for caching are usually shared among several beneficiaries. Workloads from distinct applications or assigned to different LUNs have different Service Level Agreements (SLAs). Example service levels may include the expected average response time for an IO operation on the TLU, the number of IO operations that may be performed on a given TLU, and other similar parameters. One manner in which the storage system 100 seeks to meet the SLAs for the various data clients 110 is to optimize use of the cache 118.

Cache mechanisms are crucial to computer systems such as storage arrays and compute clusters. Correctly placing data with a high probability of being requested on fast memory media can substantially reduce the response times of input/output (I/O) requests. However, the diversity and the unpredictability of the I/O stream commonly nurture the allocation of large memory areas for caching purposes. Since dynamic random-access memory (DRAM) hardware is expensive, it is important to properly assess cache sizes to improve resource utilization.

Unfortunately, physical cache resources are limited, and the optimal cache area allocation may not be apparent, which may lead to inadequate resource utilization and SLA infringement.

As shown in FIG. 1, in some embodiments, one or more of the emulations 122 instantiated on storage system 100 implements a cache management system 128 configured to monitor use of cache 118 and adjust policies applied to the cache 118 to optimize performance of the cache 118. For example, as shown in FIG. 1, the cache management system 128 may allocate different volumes of the cache for use by each of the TLUs, to optimize overall performance of the cache. Likewise, the cache management system 128 may change cache policies applied to portions of the cache 118 to optimize overall performance of the cache 118 and, hence, performance of the storage system 100.

Cache performance may be measured by looking at what percentage of reads are able to be serviced from the cache. If an address is requested by an application such as data client 110, and the address is contained in the cache 118, a cache hit occurs and the read request can be serviced from the cache. If an address is requested by an application such as data client 110, and the address is not contained in the cache 118, a cache miss occurs and the read request must be serviced from the discs of the storage array. The percentage of cache hits is referred to herein as cache hit ratio.

There is no general rule that specifies the amount of cache required to obtain a given cache hit ratio. The intrinsic dynamics of the Least Recently Used (LRU) eviction policy and the stochastic behavior of the workload makes the functioning of the cache difficult to predict. Often, cache sizes are set by experimenting with different sizes to assess performance, which may be too costly or not viable in certain situations.

It is possible to prefetch data into the cache in an attempt to increase the hit rate associated with the cache. Prefetching is a well-known technique to optimize cache behavior. It exploits data locality with the assumption that applications often request data residing in sequential addresses in a given address space. Namely, when a device's operating system receives a data access request at a certain address, $A_i$, the system retrieves not only the content of that location, but also the content of the N subsequent address locations, $\{A_{i+1}, \ldots, A_{i+N}\}$, before the application actually requests the data from those other addresses. The operating system then places the retrieved content in the cache 118, which, by design, is a much faster media than the discs 113 of storage array 112 where the data originally resides. If the application (e.g. data client 110) indeed requests data from subsequent addresses, the operating system satisfies those requests directly from the cache 118, instead of fetching data from the slower media at each request.

Unfortunately, cache performance tends to be affected as the workload changes over time. The frequency of requests, their sizes, and how sequential the reads are can change over time, and these changes can drastically affect how much benefit the cache will provide. For example, if a workload changes from initially having primarily sequential requests, and then changes to having primarily random requests, the cache performance can change dramatically.

Storage systems typically have a single prefetching policy, with a cache policy that applies to the entire cache and has a single fixed prefetch look-ahead window. This is not ideal because several applications, with different data access patterns, may access the storage system resources concurrently, and each access pattern traverses the address space of the system distinctly. For instance, some workloads might be sequential, while other workloads might be random; some workloads might traverse the entire address space, while other workloads might be concentrated in a small range of addresses. A given prefetch policy may work quite well with one workload access pattern, while generating excessive pollution when used with another workload access pattern.

One way to determine whether a cache policy is correctly being applied to the cache 118 is to measure cache performance by simply calculating cache hits, misses, and pollution levels. However, such measurements only indicate how the cache policy is responding to the workload characteristics. Alone, these measurements/indicators cannot explain why a policy does not perform well at any given point in time, or predict how changes to the cache policy are likely to affect future cache behavior.

Unfortunately, determining the sequentiality of the workload on a given LUN is not trivial. The cache manager does not know what type of application is causing the workload, but instead only has visibility to the IO traces associated with the workload and whether the IOs were able to be serviced from the cache. Additionally, the storage system often is required to process an extremely large number of IO requests in a very short period of time. One approach would be to attempt to create a sorted sequence of unique addresses related to I/O requests over a small rolling window, and use this sorted sequence to determine the sequentiality of the workload. However, this is a computationally heavy process, and thus infeasible for practical application in large scale storage environments.

In some embodiments, a set of data structures is provided that collectively enable the sequentiality of a workload to be calculated in real time in a computationally efficient manner.

As shown in FIG. 3, system administrators often subdivide storage offered by the storage array into many logical units (LUNs), each with its own addressable space defined in logical blocks addresses (LBAs). Enterprise-grade applications are configured in such way to leverage the most out of the underlying storage configuration, and sometimes even determine how the storage should be configured. Since each LUN has its own logical address space, in some embodiments the manner of characterizing the sequentiality is implemented separately for each LUN. The LUN may be allocated a separate portion of the cache 118 or may share the entirety of the cache with other LUNs. Regardless of how the cache 118 is implemented, however, the process of characterizing the sequentiality is implemented on a per-LUN basis.

The method described herein relies on the existence of I/O telemetry data that indicates how applications traverse the address space of a storage system 100. As noted above, in some embodiments the cache management system does not know the type of application that generated the I/O, but rather only has access to storage telemetry data, in the form of I/O traces. An IO trace, as that term is used herein, is a collection of pieces of information associated with an IO operation that indicates what type of I/O operation the application issued (e.g., 'read' or 'write'), the size of the operation, a timestamp associated with the operation, and in indication of an address in the storage's addressable space. An example of such storage telemetry data is shown below in Table I. In Table I.

fileid: An identification of the storage system
timestamp: The date and time of the request
op: The type of operation (read, write, control, etc.)
cpu: The host controller in the system that handled the request
tdev: An identification of a logical unit (LUN) of a system
lba: The logical block address accessed by the request in the given LUN
size: The size of the operation in number of blocks

TABLE I

| | | | | | | | |
|---|---|---|---|---|---|---|---|
| I/O | ID | FileID (who) | Timestamp (when) | Op (what) | CPU | tdev lba (where) | Size (how much) |
| 0 | 606 | 0 | 33028 | Write | 61 | 166 4246591162 | 1 |
| 1 | 702 | 0 | 37843 | Write | 77 | 166 4246591163 | 1 |
| 2 | 1494 | 0 | 96355 | Write | 45 | 166 4246591164 | 1 |
| 3 | 1857 | 0 | 119314 | Write | 61 | 166 2015795053 | 1 |
| 4 | 1909 | 0 | 122740 | Write | 29 | 166 2015795054 | 1 |
| 5 | 1926 | 0 | 124447 | Write | 45 | 166 2015795055 | 1 |

(Example Storage Telemetry Data)

The example storage telemetry data, in the form of IO traces shown in Table 1, shows several example traces received by a particular system. This type of storage telemetry data is able to be collected in a storage system 100 and, as discussed in greater detail herein, can be exploited to reveal how I/O workloads and access patterns vary with time by reflecting aspects of the seasonality of the operations associated with them.

In the following discussion, the logical addressable space, such as the logical address space of the LUNs shown in FIG. 3, is considered to be segmented into blocks of contiguous Logical Block Addresses (LBAs), referred to herein as "pages". For example, a storage system 100 may use pages of 256 LBAs, which is equivalent to 128 kilobytes. For convenience, this disclosure will use the term "address" and "page" interchangeably to refer to the logical block of data retrieved by a storage system 100 in response to a read request. Different storage systems 100 may retrieve different size blocks of data, depending on the implementation.

According to some embodiments, the cache management system first finds sequences in the traces of telemetry data comprising collections of address related to subsequent I/O requests that were sent to the same LUN. Next, those patterns are used to compute a sequentiality histogram for the LUN specifying how many sequences of each length occurred in the set of traces being considered.

Figure 4:
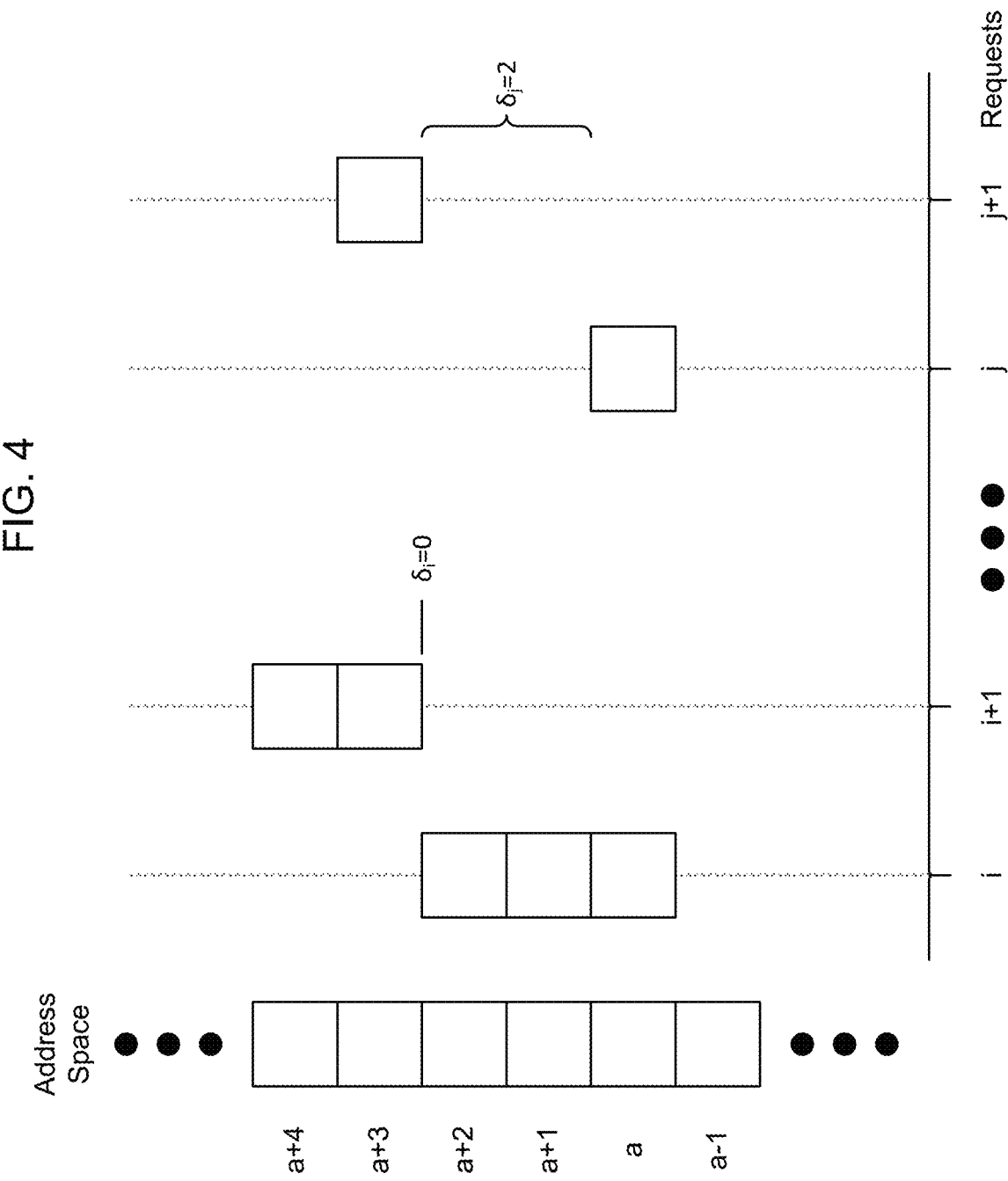
FIG. 4 is a graph showing an example set of cache requests.

FIG. 4 is a graph showing an example set of IO traces associated with an example set of cache requests. Strictly speaking, two subsequent I/O requests in a given workload, $\{req_{i-1}(Address_{i-1}, Size_{i-1}), req_i(Address_i, Size_i)\}$, are sequential if and only if $\delta_i = Address_i - (Address_{i-1} + Size_{i-1}) = 0$. Therefore, finding sequences in some embodiments is implemented by computing $\delta_i$ for every request and aggregating addresses for which $\delta_i = 0$. In FIG. 4 this is represented by the set of traces i and i+1. Traces j and j+2 are not sequential, because they are separated by $\delta_j = 2$.

Figure 5B:
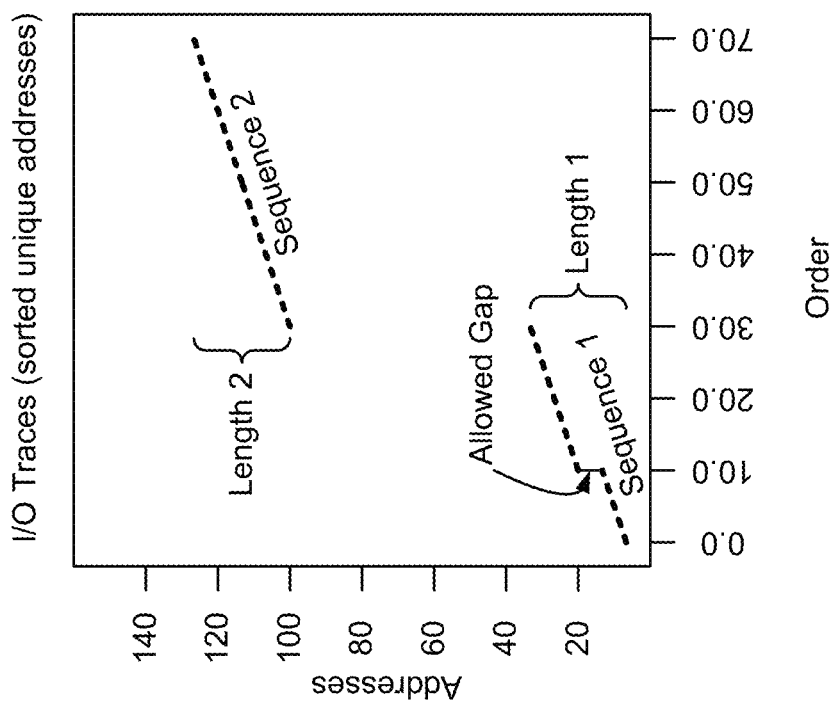
FIG. 5B is a graph showing the example set of cache requests of FIG. 5A sorted by address and discarding repeated access to the same address.
Figure 5A:
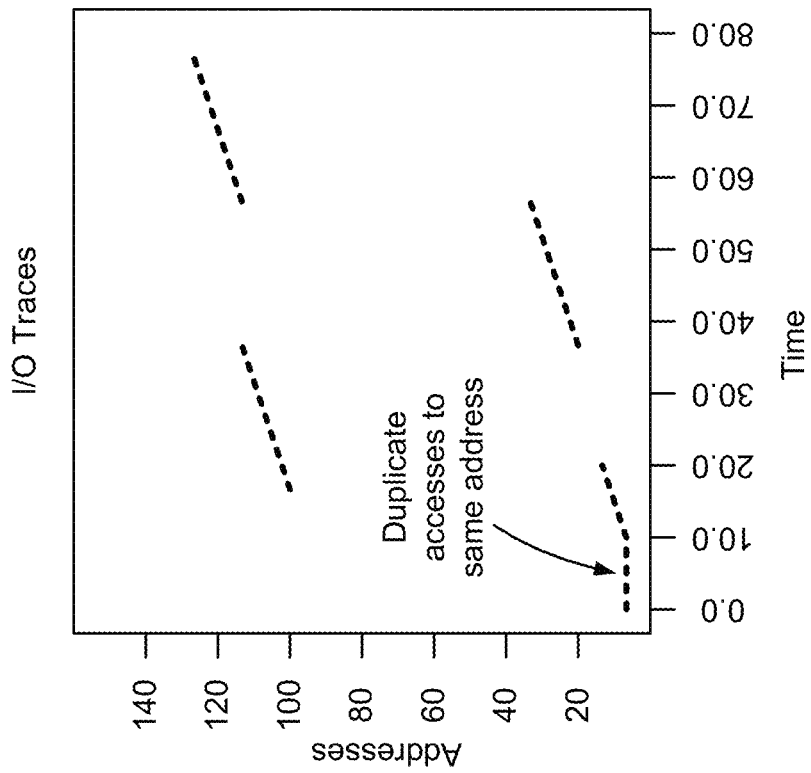
FIG. 5A is a graph showing an example set of cache requests over time.

FIG. 5A is a graph showing an example set of cache requests over time. As shown in FIG. 5A, a given workload (trace of IOs) may be generated by several parallel processes accessing the storage across different address ranges at the same time. As a result, the recorded telemetry data, once serialized, can contain gaps in address ranges. This is shown in FIG. 5A, where two IOs in the address range of between 0 and 40 are separated by an IO in the 10-20 address range.

FIG. 5B is a graph showing the example set of cache requests of FIG. 5A sorted by address and discarding repeated access to the same address. Specifically, as shown in FIG. 5B, in some embodiments, to make the process of finding sequences easier, an IO trace data structure (See FIGS. 7-8) is used to hold a short history of the last n addresses accessed in the precedent requests. A separate IO trace data structure is used for each LUN of the system, because each LUN has its own logical address space. The addresses contained in the IO trace data structure are sorted by address, and duplicate requests to the same address are discarded. This is shown in FIG. 5B. The objective is to collect the lengths of the sequences formed in this sorted segment of addresses.

Note, however, that gaps may still occur if sequences are not strictly sequential. Since a prefetching policy may still benefit from loading those addresses to cache, the sequentiality condition is relaxed and some gaps of fixed sizes in the sequences are allowed. Note also the repeated accesses to the same address are discarded. While being beneficial to any cache policy, repeated accesses do not contribute to the definition of sequences.

The subroutine set forth below in Table II, written in Python, shows one possible implementation of a sequence finding algorithm. It receives, as input, a sorted list of n unique addresses of a given LUN and an allowable gap, which defaults to 1. Note that, once the addresses are sorted, the sizes of the requests are no longer useful for computing $\delta_i = Address_i - (Address_{i-1} + Size_{i-1}) = 0$. As a result, the allowed gap, in the end, is the average size of the requests in the set, but other values could also be used. For example, if the pre-fetch policy specifies that each time a page is loaded, that the subsequent 8 pages should also be loaded, if a gap occurs in the sorted unique addresses that is less than 8, the cache still would have benefitted from having the page pre-loaded. Accordingly, in that instance a gap of up to 8 pages may be tolerated in the sequentiality calculation. The algorithm returns all sequences found, defined by the start address and the length.

TABLE II

```
1   def find_sequences(addresses, gap=1):
2       """
3       Find sequences in a sorted list of unique addresses, allowing a gap
4       between subsequent addresses. The gap enables us to take into account
5       the average size of the requests associated with the given addresses.
6
7       addresses: sorted list of unique addresses
8       gap: allowed gap between subsequent addresses
9       """
10
11      length = 1
12      start = addresses[0]
13
14      # accumulate sequences in a list
15      seq = [[start, length]]
16
17      # traverse all values in a given address list
18      for i in range(1, len(addresses)):
19          d = addresses[i]-addresses[i-1] # compute difference from previous value
20          if d <= gap: # if diff within allowed gap
21              length += d # add difference to total sequence length
22          else:
23              seq[-1][1] = length # complete current sequence
24
25              length = 1
26              start = addresses[i]
27              seq.append([start, length]) # create new sequence
28
29      # return all formed sequences
30      return seq
```

Figure 6:
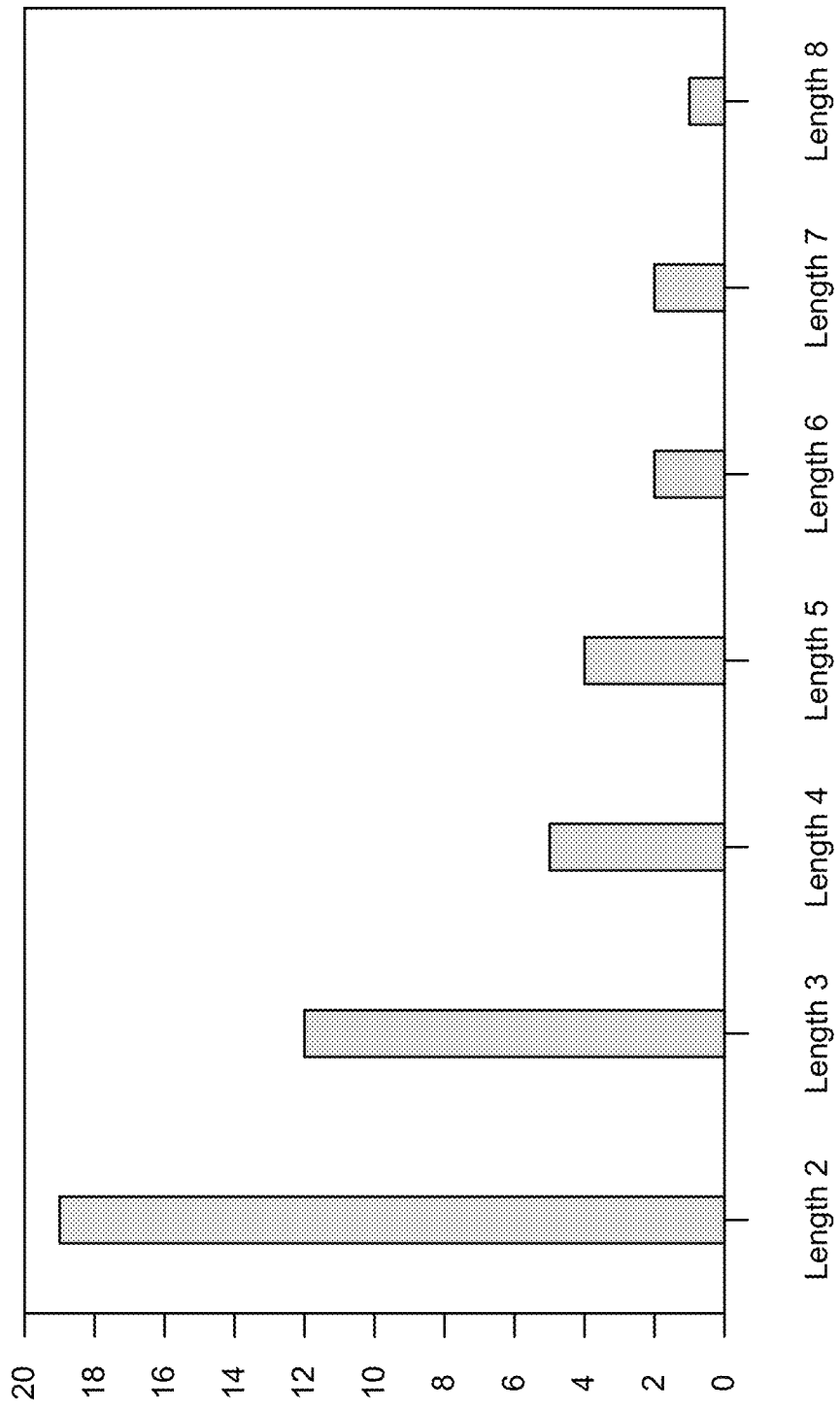
FIG. 6 is a histogram of lengths of sequences observed in a set of cache addresses.

From this output, a histogram of the lengths of the sequences observed in that set of addresses is computed. In some embodiments, the histogram may take the form shown in FIG. 6. Specifically, FIG. 6 is a histogram of an example set of lengths of sequences of accesses to subsequent cache addresses that were accessed by a preceding number of IO traces.

In some embodiments, the process of finding sequences in a list of addresses is executed every time a new I/O request arrives. Additionally, before finding sequences, the address of the pages in the list are sorted and deduplicated. Subsequently, the resultant list is traversed to compute the histogram of sequence lengths.

Additional details associated with composing the histogram in a computationally efficient ware are set forth in greater detail below. Of notable importance, the algorithm is a linear-time algorithm that enables sequences to be found and histograms associated with their lengths to be calculated in a window of a given workload's IO traces. As a sub-product of the method, the intermediate data structures generated include the sorted lists of unique addresses requested during that window, which are also useful for many cache policies that rely on sequentiality detection.

For the sake of simplicity and without loss of generality, an explanation will be provided considering only one LUN. The generalization of the method described herein for application in a large-scale storage environment including multiple LUNs is straightforward and should be apparent to anyone skilled in the art.

FIG. 7 is a functional block diagram of an IO trace data structure 700, containing a representation of a workload's IO trace over time, with the requested pages being ordered by time of request at time (i=2). The index i indicates the start of a rolling window W of size w, ending at a request i+w. FIG. 8 is a functional block diagram of the IO trace data structure 700 at a subsequent increment of time (i=3). A new page (block 9) is added to the window and one page (block 7) is removed. The index I, identifying the start of the window, advances in the trace order each time a new IO arrives on the LUN.

As shown in FIG. 7, in some embodiments the workload's IO trace is represented for a given LUN, and rolling window of its most recently requested pages is loaded to the IO trace data structure and used to determine the current sequentiality profile of the IO trace workload contained in the window.

Let T be a workload's I/O trace represented by a sequence of page requests. For purposes of the method described herein, requests of multiple pages can be considered a sequence of requests of a single page.

FIG. 7 shows an example I/O trace in a simplified representation. Specifically, in FIG. 7 a window W is identified over a set of IO traces with a starting index i=2, and the size of the window is w. In the example shown in FIG. 7, and in further examples, boxes with numbers inside represent page addresses that were accessed by IO traces. The figures use representative numbers for the page addresses, the I/O trace sizes, and show very short windows of only a few pages for ease of explanation. In typical environments the number of pages that make up a trace T is very large, and, correspondingly, the window size W in an actual implementation would include a very large number (thousands or tens of thousands) of pages.

Note that the algorithm only considers the order in which requests are processed, without regard for the time between the actual requests. This is because the cache will be static in between IO traces, with nothing being added or evicted, so the time when the traces arrive is immaterial to calculating sequentiality.

FIG. 8 shows the example I/O trace at the next interval (i=3), once a subsequent trace associated with IO on address [9] has been added to the sliding window. Specifically, in FIG. 8, the sliding window has been moved forward such that the starting index is located at i=3. This results in address [7] being removed from the set of addresses considered in the sequentiality determination, and address [9] being added to the set of addresses considered in the sequentiality determination. Every time the sliding window W is moved, one page is evicted and a new page is added. This requires the sequentiality determination to be updated each time the sliding window W is incremented.

As noted above, in some embodiments an efficient way of characterizing the sequentiality of the workload is provided, which may efficiently be implemented each time the sliding window is updated such that the data structures used to characterize the sequentiality of the workload are able to be updated with each update of the sliding window in real time in a computationally efficient manner.

In some embodiments, W is defined to be a rolling window over T since every new incoming request will cause it to be updated. Typically, the request i+w includes the newest request on a LUN in the storage system. The example of FIG. 7 illustrates an intermediate state in which a new request (address [9] on the right-hand side of FIG. 7) is acknowledged by the LUN, but the sliding window has not yet updated. FIG. 8 shows the state of the system once the window W has been updated to reflect the new state, with the new request on address [9] included in the sliding window, and address [7] being evicted.

In some embodiments, an auxiliary data structure Page Counts is used to store the number of occurrences of each page in the window. The page counts data structure, in some embodiments, is implemented as a hash map data structure that is updated each time W is updated.

FIG. 9 is a functional block diagram representation of an example page count data structure 900 correlating a page count with a number of instances that the page appears in the workload within the sliding window of the IO trace data structure 700. The numbers included in the example page count data structure 900 shown in FIG. 9 correlate to the example sliding window of IO traces shown in the workload of FIG. 7.

FIG. 10 is a functional block diagram representation of an updated version of the page count data structure 900 of FIG. 9. The numbers included in the updated example page count data structure 900 shown in FIG. 10 correlate to the example sliding window of IO traces shown in the workload of FIG. 8. As shown in FIG. 10, when the IO trace data structure 700 is updated to move from the state shown in FIG. 7 to the state shown in FIG. 8, address [7] is removed from the sliding window W and address [9] is added to the sliding window W. Initially, the page count data structure 900 shown in FIG. 9 shows a page count of two on address [7], and a page count of one on address [9]. The updated page count data structure 900 shown in FIG. 10 shows a page count of one on address [7] (−1 from FIG. 9) and a page count of two on address [9] (+1 from FIG. 9). Accordingly, each time a page is added to the sliding window or removed from the sliding window the page count data structure 900 is updated to reflect the correct number of instances that the page appears within the sliding window of the IO trace data structure 700.

In some embodiments, if an entry in the page count data structure 900 is decremented to a value of zero, the entry is deleted from the page count data structure 900. This avoid excessive memory consumption as the window progresses over the I/O trace. In the explanations below, due to the limited size of the examples, entries with a zero value in the page count data structure 900 are not deleted for ease of explanation. In some embodiments, if the page count data structure 900 initially does not have an entry for a page, when the page is added to the IO trace data structure 700, a new entry associated with that page is added to the page count data structure 900.

As noted above, a goal is to determine how many sequences of addresses are contained in the window W, and to determine the lengths of those addresses. In some embodiments, two additional data structures are created that are used to implement this process to enable a histogram of sequence lengths to be created:

a doubly linked List of Sequences data structure 1100, which is a dynamic, "list-of-lists" data structure that records all sequences found. In this structure, the pages of the rolling window are sorted and deduplicated; and
  a hash map of Sequence Lengths data structure 1200, which records the length of each sequence in the List of Sequences data structure, and is used to update a histogram data structure H 1250.

The algorithm is invoked at every new incoming request and builds, for a predetermined gap value, a list of sequences. The list of sequences in some embodiments is a list of groups of requests separated by at most gap address.

It is possible to consider an update to the window W, as a combination of an initial removal of a page followed by an insertion of the page. Table III, set forth below, contains pseudocode for a process of updating the window W.

TABLE III

```
UpdateSequencesHistogram(T, i, w, gap):
1.      if i > 0:
2.          rm ← T[i - 1]
3.          PageCount[rm] ← PageCount[rm] - 1
4.          if PageCount[rm] = 0:
5.              Removal(rm, gap)
6.          end if
7.      end if
8.      ad ← T[i + w]
9.      PageCount[ad] ← PageCount[ad] + 1
10.     Insertion(ad, gap)
```

Given the workload I/O trace data T, the starting index of the current window i, a window size w, the I/O workload from telemetry data and a gap value, this algorithm builds the List of Sequences data structure 1100, Sequence Lengths data structure 1200, and the histogram H data structure 1250. The pseudocode contained in Table III assumes global access to these data structures and, hence, the pseudocode contained in Table III has no explicit return statement, with the updated state of the structures being its implicit return value.

In the pseudocode of Table III, global access to the page count data structure 900 is assumed. As noted above, normally when a page count reaches zero it would be deleted from the page count data structure. In the following description, zero value entries are not deleted from the page count data structure for easy of explanation.

Initially, all five data structures (IO trace data structure 700, page count data structure 900, list of sequences data structure 1100, sequence lengths data structure 1200, and histogram data structure 1250) are empty. In some embodiments, whenever a new request arrives or leaves the window, a check is performed to determine whether there is a correspondent entry for the page in the page count data structure. In general, there are two kinds of operations that can occur in the several data structures—a first operation associated with a removal of a page from the window and a second type of operation associated with an insertion of a page into the window. In some embodiments, removal operations are processed first and the insertion operations are then processed after the removal operation has been completed. It should be understood, however, that the order of processing may be reversed by first causing the insertion operation to be implemented and then the removal operation to be implemented. Likewise, in some embodiments a determination is made as to whether the page being removed from the window is the same as the page being added to the window. In this rare instance, no updates need to be made to any of the data structures except to update the IO trace data structure 700 itself.

Except for the first w requests, every new request provokes the removal of the oldest request in the window. Upon removal of a page from the window, the corresponding entry for the page in the page count data structure is reduced by 1. If the page count entry for the address is greater than 0 after being updated, removal of the age from the window does not affect the sequentiality of the workload and no other updates to the other data structures 1100, 1200, 1250, is required. If removal of the page causes the Page Count entry in the page count data structure 900 associated with the removed page to become zero, that means that no other instance of this page exists in the window. In such scenario, a removal procedure is performed in the list of sequences data structure 1100 and the other data structures 1200, 1250 are likewise updated. Specifically, the list of sequences data structure is updated to remove the page from the sequence in which it appears in the list of sequences data structure. Removal of the page from the list of sequences will change the lengths of the sequences which will affect the sequence lengths data structure 1200 and the histogram data structure 1250.

It should be noted that, because duplicate pages are removed, a page will appear in precisely one sequence in the list of sequences data structure. The page may stand alone as a sequence of one, or may be part of a larger sequence along with other pages. Where the page is not part of a larger sequence, removal of the page causes the sequence of one to be removed from the list of sequences data structure. Where the page is part of a lager sequence along with other pages, removal of the page causes the larger sequence to be shortened by one or causes the larger sequence to be split into two shorter sequences, depending on the position of the page within the larger sequence.

Figure 11:
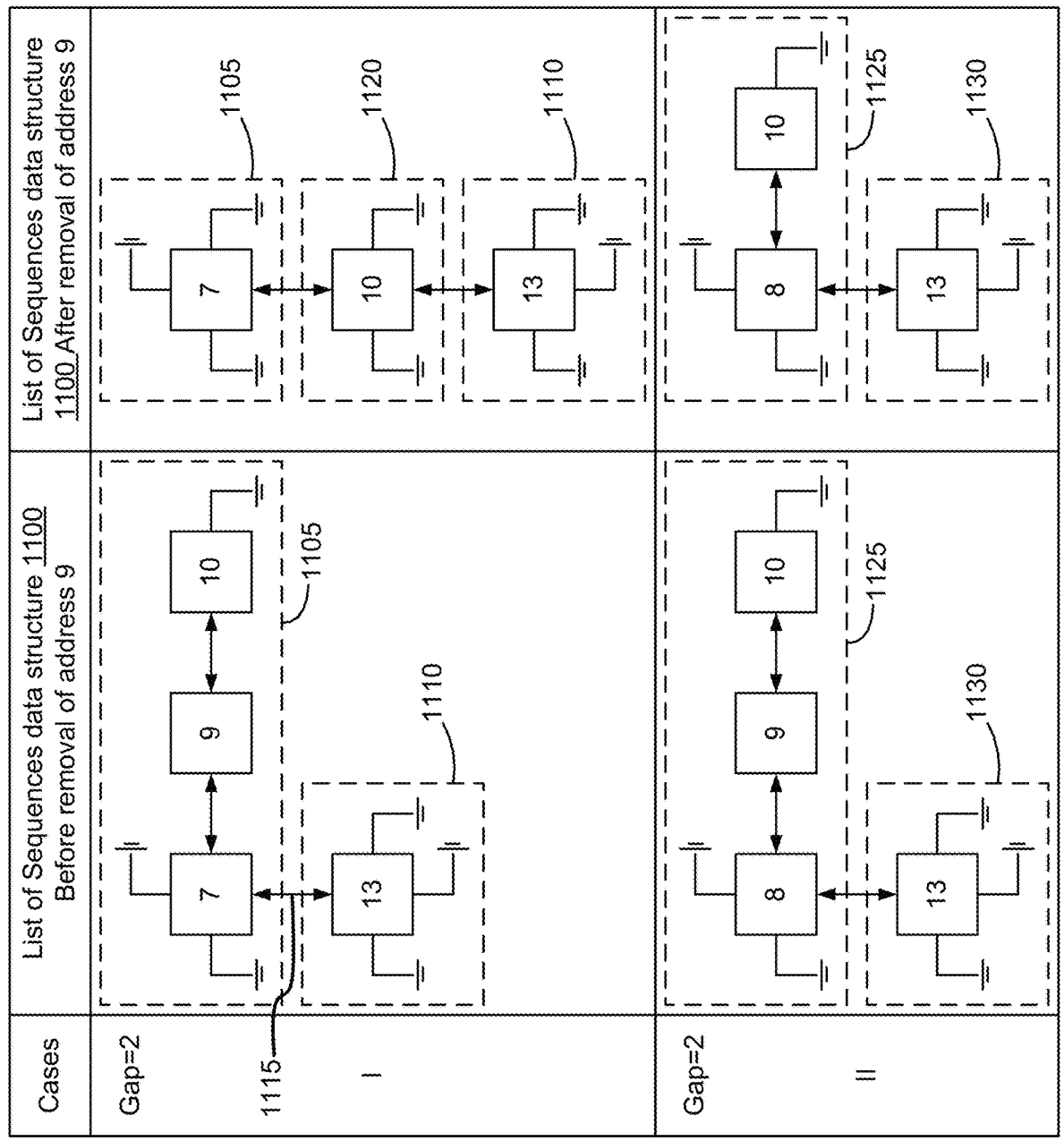
FIG. 11 is a functional block diagram of a list of sequences data structure showing two examples of how the list of sequences data structure changes in connection with removal of an address from the sliding window of IO traces.

FIG. 11 is a functional block diagram of an example list of sequences data structure 1100 showing two examples of how the list of sequences data structure 1100 changes in connection with removal of an address from the sliding window of IO traces, when removal causes the page count for that page to drop to zero in the page count data structure 900. In both examples in FIG. 11 (case I and case II), address [9] is being removed from the list of sequences data structure 1100.

As shown in FIG. 11, focusing initially on case I, the list of sequences data structure includes a first sequence 1105 and a second sequence 1110. The sequences are included in a doubly linked list in which each entry (e.g. 1105, 1110) in the list of sequences data structure 1100 includes a pointer to the previous entry in the list and a pointer to the following entry in the list. In some embodiments, the entries in the list are the head ends of the sequences. This is illustrated in FIG. 11 with double-ended arrow 1115 extending from address [7] to address [13].

When a page is to be removed, the page's location is located in the list of sequences data structure and removed from the sequence. The process then determines whether, after removal of the page, the difference between the subsequent and the preceding pages is larger than the gap distance.

If, after removal of the page, the difference between the previous and subsequent page in the previous sequence is larger than the gap distance, the previous sequence is split into two new sequences. This is shown in case I in FIG. 11. Specifically, in this example the gap distance is set to two. Initially, as shown on the left, before removal of address [9], the list of sequences data structure 1100 included a sequence 1105 starting at address [7] and including addresses [7], [9], and [10]. Upon removal of address [9], the sequence 1105 would be changed to include only addresses [7] and [10]. Since addresses [7] and [10] are more than the gap distance of 2 away from each other, the original sequence ([7], [9], [10]) is split into two new sequences—a first sequence with a head address of [7] and length 1, and a second sequence with a head address of [10] and length 1. This is shown on the right-hand side of FIG. 11 in which the list of sequences data structure 1100 has been updated. Specifically, sequence 1105 has been changed to include only address [7], and a new sequence 1120 has been added with a head address of [10]. Sequence 1110 has not changed, except that the pointer of sequence 1110 has been changed to point to the head of sequence 1120. Similarly, the pointer of sequence 1105 has been changed to point to sequence 1120 instead of the head address of sequence 1110.

The second row of FIG. 11 (case II) shows an example in which the list of sequences data structure 1100 initially includes a first sequence 1125 including addresses [8], [9], and [10], and a second sequence 1130 including address [13]. Upon removal of address [9] from the first sequence 1125, the first sequence 1125 is changed to include only addresses [8] and [10]. Since addresses [8] and [10] are less than the gap distance of 2 away from each other, the original sequence 1125 is reduced in length but is not split into two new sequences. This is shown on the right-hand side of FIG. 11, in which the list of sequences data structure 1100 has been updated. Specifically, sequence 1125 has been changed to include only addresses [8] and [10]. Sequence 1130 has not changed. Since the head ends of sequences 1125 and 1130 have not changed, no changes are required to the pointers of the doubly linked list.

FIG. 12 is a functional block diagram of a sequence lengths data structure 1200 and a histogram data structure 1250 showing two examples of how the sequence lengths data structure 1200 and histogram data structure 1250 change with removal of an address from the IO trace data structure 700 causes the page count for the address to drop to zero in the page count data structure 900. The numbers included in the data structures 1200, 1250 shown in FIG. 12 correlate to the example sequences (case I and case II) included in the list of sequences data structures 1100 shown in FIG. 11.

As shown in FIG. 12, in some embodiments the sequence lengths data structure 1200 maintains a list of the head end nodes of each sequence and the length of the sequence. Looking at the list of sequences data structure 1100 for case I before removal of address [9], it is clear that the list of sequences data structure includes one sequence 1105 having a starting address of [7] of length three (addresses [7], [9], [10]), and one sequence 1110 having a starting address of [13] and a length of one (address 13). The sequence lengths data structure shown in FIG. 12 contains this data. Specifically, the sequence lengths data structure for case I, before removal, shows that the sequence length data structure 1200 includes two entries—a first entry with a head address of [7] and length 3, and a second with a head address of [13] and length 1. The particular addresses that are contained in the sequences are not included in the sequence lengths data structure—only the starting address and the length of the sequence.

FIG. 12 also shows that after removal, the sequences lengths data structure 1200 has three entries—a first entry having a starting address of [7] and a length 1, a second entry having a starting address of [10] and length 1, and a third entry having a starting address of [13] and length 1. These entries correlate to the sequences contained in the list of sequences data structure after removal of address [9] for case I.

Similarly, for case II, prior to removal of address [9] the sequence lengths data structure 1200 has a first entry having a starting address of [8] and length 3, and a second entry having a starting address of [13] and length 1. After removal of address [9], the sequence lengths data structure 1200 is updated to have a first entry having a starting address of [8] and length 2, and a second entry having a starting address of [13] and length 1. These entries correlate to the sequences 1125, 1130 contained in the list of sequences data structure 1100 (FIG. 11) after removal of address [9] for case II.

FIG. 12 also shows the histogram data structure 1250. In some embodiments, the histogram data structure 1250 is a list of sequence lengths and a count of how many sequences of that length are contained in IO traces of the sliding window of IO traces currently contained in the IO trace data structure 700. FIG. 6 graphically shows an example histogram data structure H 1250. In this example, the sliding window includes 19 sequences of length 2, 12 sequences of length 3, 5 sequences of length 4, etc. The histogram data structure 1250 uses the data contained in the sequence lengths data structure 1200 to update the counts of how many sequences of each length are contained in the sliding window.

For example, as shown in FIG. 12, initially the sequence lengths data structure 1200 contains one entry for a sequence of length 3 and one entry for a sequence of length 1. Accordingly, the histogram data structure 1250 has two entries, one entry for sequences of length 3 with a count value of 1, and one entry for sequences of length 1 with a count value of 1. After removal of address [9], the sequence lengths data structure 1200 contains three entries sequences having length 1 (with head addresses of [7], [13], [10]). Accordingly, the histogram data structure 1250 has one entry for sequences of length 1 with a count value of 3. The histogram data structure 1250 in FIG. 12, as illustrated, also has an entry for a sequence of length 3 with a count value of 0, although this entry could be deleted.

Likewise, for case II, initially the sequence lengths data structure 1200 contains one entry for a sequence of length 3 and one entry for a sequence of length 1. Accordingly, the histogram data structure 1250 has two entries, one entry for sequences of length 3 with a count value of 1, and one entry for sequences of length 1 with a count value of 1. After removal of address [9], the sequence lengths data structure 1200 contains one sequence having a length of 2, and one sequence having length 1. Accordingly, the histogram data structure 1250 is updated after removal of address [9] to change the count value of sequences length 3 from 1 to 0, to update the count value of sequences of length 2 from 0 to 1. The number of sequences of length 1 has not changed.

Figure 16:
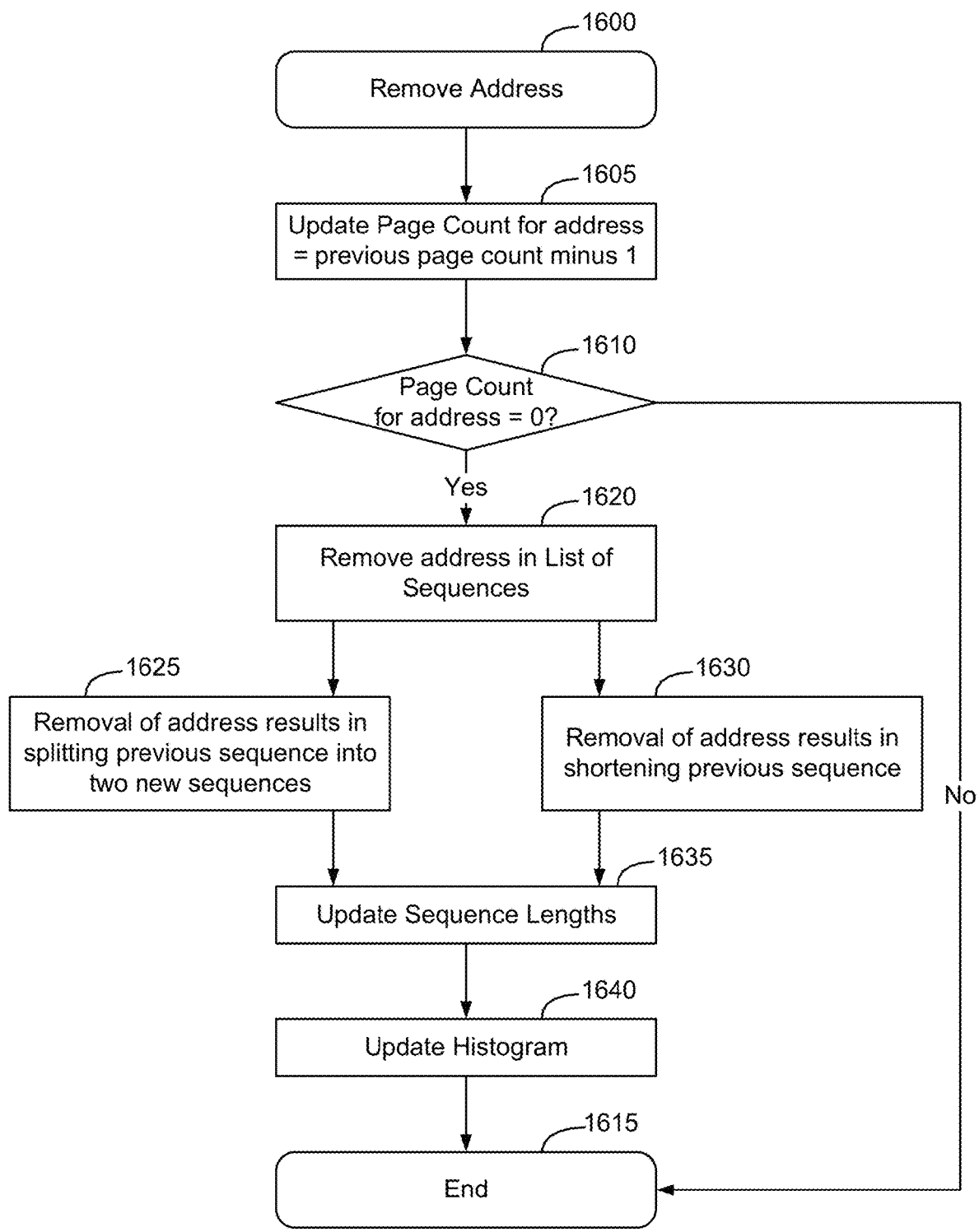
FIG. 16 is a flow chart of a method of removing an address from the list of sequences data structure, according to some embodiments.

FIG. 16 is a flow chart of a method of removing an address from the list of sequences data structure, according to some embodiments. As depicted in FIGS. 11-12, and as shown in FIG. 16, whenever an address is removed from the window of traces of the IO data structure 700 (FIG. 16, block 1600), the page count for that address is updated (block 1605) by reducing the entry corresponding to the address in the page count data structure 900 by one (page count for address=previous page count minus 1). A determination (block 1610) is then made as to whether the page count for that address equals zero. If the page count does not equal zero (a determination of NO at block 1610) the sliding window still contains at least one instance of the page that was just removed from the window. Accordingly, the other data structures (1100, 1200, 1250) do not need to be updated since removal of the page from the window will not affect any of the sequences. Accordingly, the process of removing the address from the window ends (block 1615).

If removal of the address from the IO trace data structure 700 causes the page count for the address to equal zero in the page count data structure 900 (a determination of YES at block 1610), removal of the address will affect at least one sequence and, accordingly, all the other data structures (1100, 1200, 1250) need to be updated. Accordingly, as shown in FIG. 16, the address is located in the list of sequences data structure 1100 and removed from the list of sequences data structure 1100 (block 1620). This is described in greater detail above in connection with the description of FIG. 11. Removal of the address can result in two different updates depending on the location of the address in the sequence and the characteristics of the sequence that contain the address. Specifically, removal of the address can result in splitting of a previous sequence into two new sequences (block 1625) or removal of the address can result in shortening of the previous sequence (block 1630). Shortening a previous sequence can be implemented by removing the address from the front of the sequence, middle of the sequence, or the end of the sequence. Where the address is the only address in the sequence, removal of the address can result in the total removal of the sequence. As discussed in greater detail above, removal of the address can result not only in adjusting the sequences themselves, but also results in reorganization of the pointers of the double linked list to cause the pointers to point to the correct entries in the updated list of sequences data structure.

After updating the list of sequences data structure 1100, the sequence lengths data structure 1200 is updated (block 1635) and the histogram data structure 1250 is updated (block 1640). Additional details associated with updating the sequence lengths data structure 1200 and histogram data structure 1250 are provided above in connection with FIG. 12. Once all the data structures are updated, the process ends (block 1615).

In some embodiments, the list of sequences data structure 1100 is a double linked list, and the sequence lengths data structure 1200 is implemented as a hash map. Use of these types of data structures enables all updates to be implemented in O(1) time complexity, which enables these updates to occur in real time every time an address is removed from the window of traces maintained by the IO trace data structure 700. Accordingly, it is possible using this set of data structures to maintain an updated histogram of sequence lengths contained in the sliding window of traces. Knowledge about the type of accesses occurring in the sliding window, and the lengths of sequences seen in the IO traces during the window, enables a more intelligent cache prefetching policy to be implemented by the cache management system 128 on the cache 118 to optimize performance of the cache 118.

Figure 13:
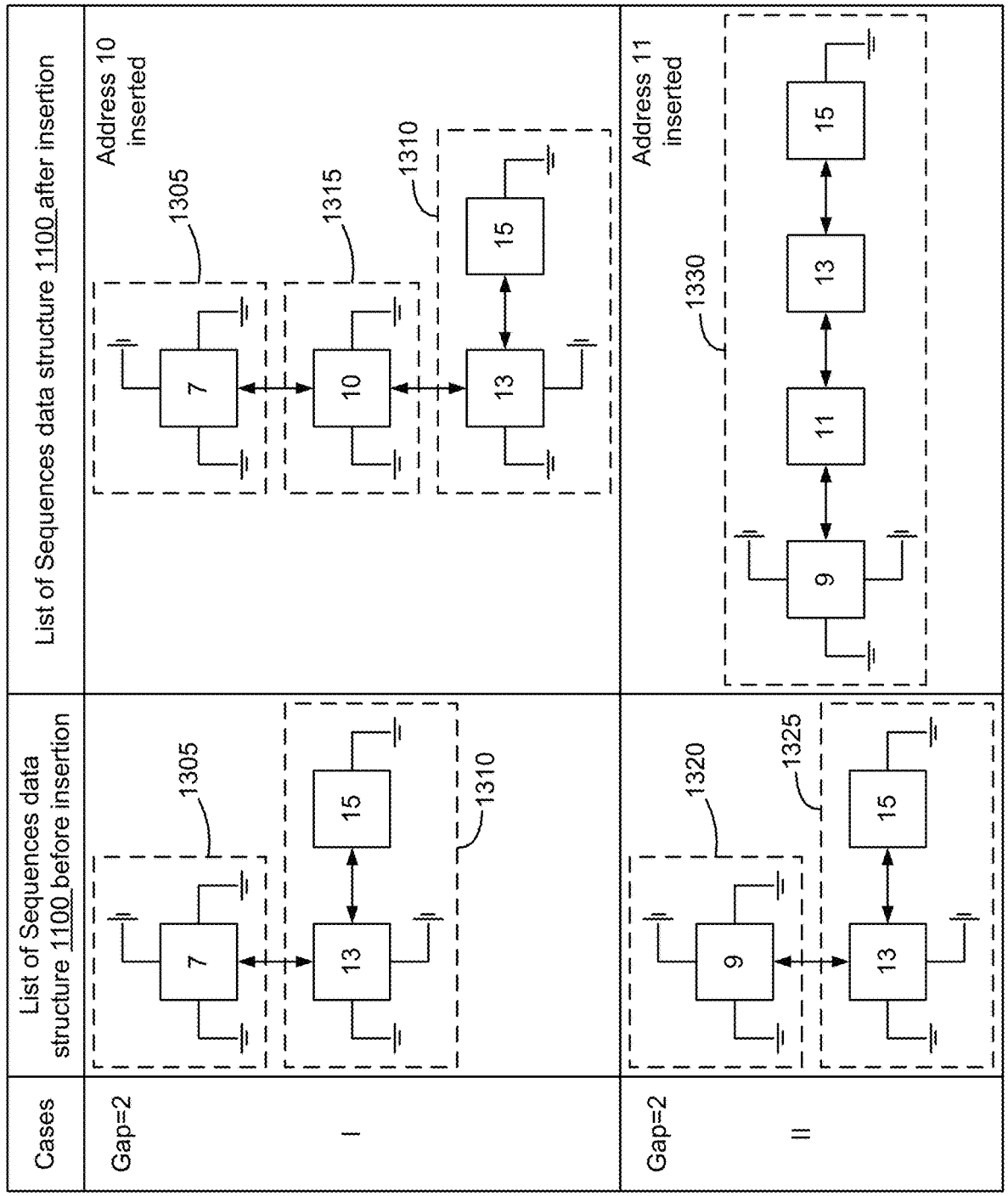
FIGS. 13 and 14 are functional block diagrams of the list of sequences data structure showing four examples (two examples in FIG. 13 and two examples in FIG. 14) of how the list of sequences data structure changes in connection with insertion of an address into the sliding window of IO traces.
Figure 14:
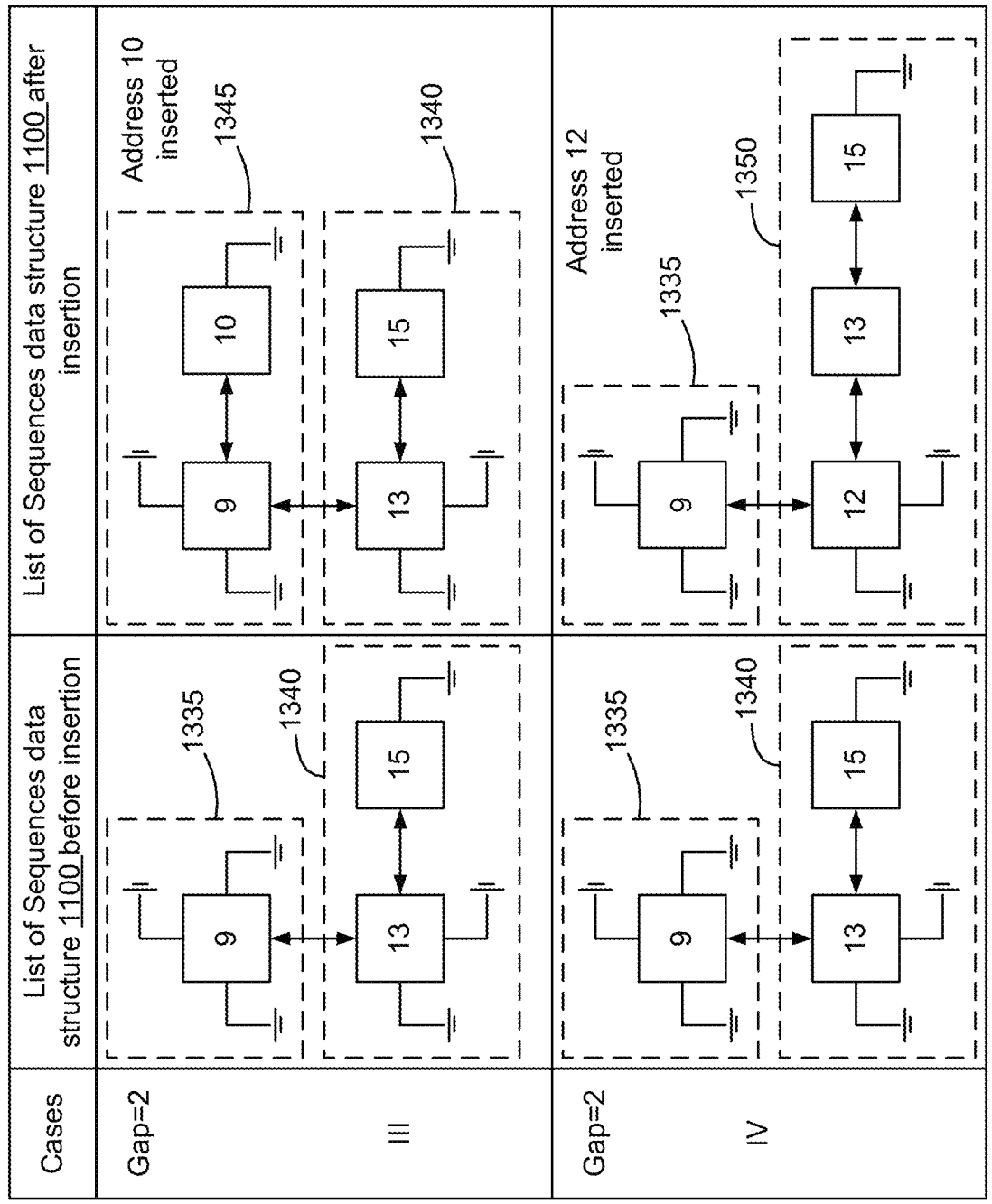

FIGS. 13 and 14 are functional block diagrams of the list of sequences data structure 1100 showing four examples (two examples in FIG. 13 and two examples in FIG. 14) of how the list of sequences data structure 1100 changes in connection with insertion of an address into the sliding window of IO traces maintained by the IO trace data structure 700.

FIG. 15 is functional block diagram of the sequence lengths data structure and the histogram data structure 1250 showing four examples of how the sequence lengths data structure 1200 and histogram data structure 1250 change with insertion of an address from the sliding window of IO traces. The numbers included in the data structures shown in FIG. 15 correlate to the example sequences included in the list of sequences data structure 1100 shown in the examples contained in FIGS. 13 and 14.

When an address is inserted into the window (FIG. 17, block 1700), the page count entry associated with the address is incremented in the page count data structure 900. If the initial page count entry associated with the address is greater than zero (before being incremented), the page already has been inserted into the various other data structures (1100, 1200, 1250) and no additional updates to the other data structures (1100, 1200, 1250) are required. Accordingly, the page count entry for the address is incremented by one in the page count data structure 900 and the process ends (block 1715).

If the page count entry for the address in the page count data structure is initially zero, adding the page will change at least one sequence in the list of sequences data structure, which will concomitantly affect the sequence lengths data structure and histogram data structure. Accordingly, if the page count for the address in the page count data structure is initially zero (or is equal to 1 after the page count has been incremented), an insertion process is performed in the list of sequences data structure and the other data structures are updated accordingly.

Figure 17:
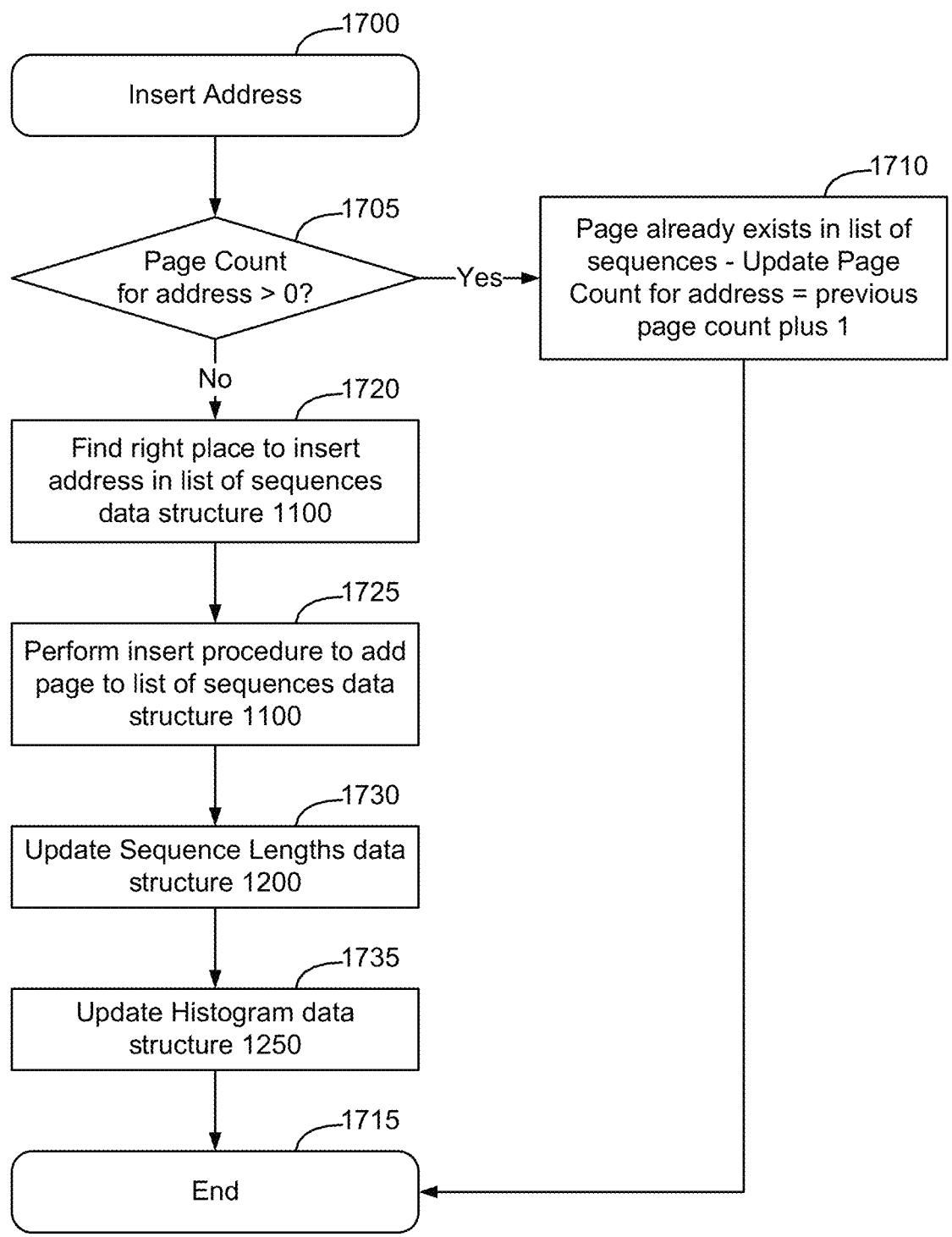
FIG. 17 is a flow chart of a method of inserting an address in the list of sequences data structure, according to some embodiments.
Figure 18:
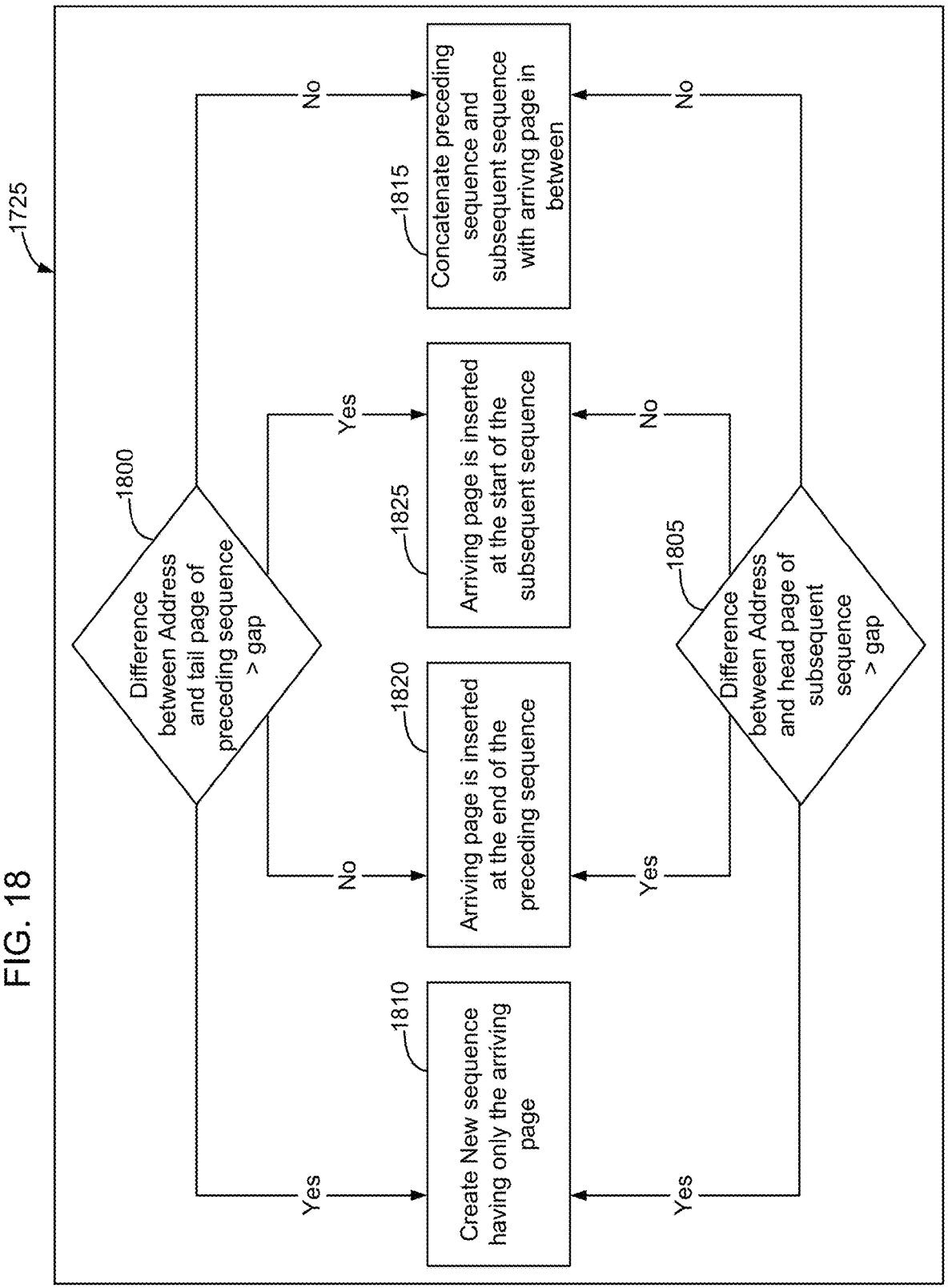
FIG. 18 is a flow chart of block 1725 of FIG. 17, providing additional details of the method of performing an insert procedure to add a page to a list of sequences, according to some embodiments.

FIGS. 13 and 14 show four example cases of how insertion of a page might affect the sequences in the list of sequences data structure. FIG. 17 is a flow chart of a method of inserting an address in the list of sequences data structure, according to some embodiments, and FIG. 18 is a flow chart of the method step 1725 of FIG. 7 providing additional details of the method of performing an insert procedure to add a page to a list of sequences, according to some embodiments.

As shown in FIG. 17, in connection with insertion of an address (block 1700), a determination is made (block 1705) as to whether the initial page count for the address is greater than zero (a determination of YES at block 1705). If the initial page count for the address is greater than zero, the page already has been inserted into the sequences and no additional updates need to be made to any of the other data structures. Accordingly, the page count for the address is updated (block 1710) in the page count data structure (page count for address=previous page count plus 1) and the process ends (block 1715).

If the page count for the address is equal to zero (a determination of NO at block 1705) the page does not exist in the data structures and the data structures will need to be updated. Accordingly, the process finds the correct place to insert the address in the list of sequences data structure 1100 (block 1720). In some embodiments, the list of sequences data structure 1100 is an ordered list of sequences, in which the sequences are ordered according to the address value of the first node in the sequence. Accordingly, in some embodiments determining the correct place to insert the address in the list of sequences data structure 1100 includes determining if the address should be added to an existing sequence or if the address should be inserted into the list of sequences data structure 1100 as a new sequence.

Once the correct location for the address has been located, an insert procedure is performed to add the address to the sequences contained in the list of sequences data structure 1100 (block 1725). The insert procedure of block 1725 is described in greater detail in connection with FIG. 18, and examples are provided below in connection with FIGS. 13-14.

Once the sequences in the list of sequences data structure 1100 are updated, the sequence lengths contained in the sequence lengths data structure 1200 are updated (block 1730) and the sequence length counts in the histogram data structure 12250 are updated (block 1735). Examples of how updating the sequence lengths data structure and histogram data structure is implemented are discussed below in connection with FIG. 15.

FIG. 18 shows the process of block 1725 in greater detail. As shown in FIG. 18, in some embodiments, once the location of where the address should be inserted is located, an insert procedure is performed on the sequences contained in the list of sequences data structure 1100 (FIG. 17, block 1725) by adding the address as a new sequence in the list of sequences data structure 1100, or adjusting one or more of the previous sequences to accommodate the new address. In particular, depending on the sequences that existed in the list of sequences data structure, insertion of the address may cause a new sequence to be created, may cause the address to be inserted into the middle of a previously existing sequence, or may cause the address to be joined at the head or tail of a previously existing sequence. In some instances, joining the new address to the head or tail of a previously existing sequence can cause the two adjacent sequences to be concatenated.

Inserting an address into the middle of an existing sequence causes the sequence length for that sequence to increase by one. The sequence within the list of sequences data structure 1100 is changed to include the address, and the other data structures 1200, 1250 are updated to reflect the new sequence length of that sequence.

Where an address is not being inserted into the middle of an existing sequence, the particular effect the insertion process has on the existing sequences depends on two factors (FIG. 18, blocks 1800 and 1805). Specifically, a first determination is made as to whether a difference between the address being inserted and the tail address of the preceding sequence is larger than the gap distance (block 1800). A second determination is made as to whether a difference between the address being inserted and the head address of a subsequent sequence is larger than the gap distance (block 1805). These determinations (1800, 1805) can be implemented in either order or simultaneously.

If the difference between the address being inserted and the tail address of the preceding sequence is larger than the gap distance (a determination of YES at block 1800), the address cannot be added to the preceding sequence. If the difference between the address being inserted and the tail address of the preceding sequence is smaller than the gap distance (a determination of NO at block 1800), the address can be added to the tail of the preceding sequence.

If the difference between the address being inserted and the head address of the subsequent sequence is larger than the gap distance (a determination of YES at block 1805), the address cannot be added to the subsequent sequence. If the difference between the address being inserted and the head address of the subsequent sequence is smaller than the gap distance (a determination of NO at block 1805), the address can be added at the head of to the subsequent sequence.

The combination of these two determinations (blocks 1800 and 1805) determines the result of the insertion process. Specifically, as shown in FIG. 18, if the difference between the address being inserted and the tail address of the preceding sequence is larger than the gap distance (a determination of YES at block 1800), AND the difference between the address being inserted and the head address of the subsequent sequence is larger than the gap distance (a determination of YES at block 1805), the block cannot be joined to either the previous or the subsequent sequence and will be inserted into the list of sequences as new sequence (block 1810).

If the difference between the address being inserted and the tail address of the preceding sequence is smaller than the gap distance (a determination of NO at block 1800), AND the difference between the address being inserted and the head address of the subsequent sequence is smaller than the gap distance (a determination of NO at block 1805), the address can be added to both the preceding sequence and the subsequent sequence. Accordingly, adding the address to the list of sequences results in concatenating the preceding sequence and subsequent sequence with the arriving page in-between (block 1815).

If the difference between the address being inserted and the tail address of the preceding sequence is smaller than the gap distance (a determination of NO at block 1800), AND the difference between the address being inserted and the head address of the subsequent sequence is larger than the gap distance (a determination of YES at block 1805), the address is inserted at the tail of the preceding sequence (block 1820).

If the difference between the address being inserted and the tail address of the preceding sequence is larger than the gap distance (a determination of YES at block 1800), AND the difference between the address being inserted and the head address of the subsequent sequence is smaller than the gap distance (a determination of NO at block 1805), the address is inserted at the start of the subsequent sequence (block 1825).

Whenever the head address of a sequence changes, or if a new sequence is added to the list of sequences data structure 1100, for example in blocks 1810, 1825, and 1815, the pointers contained in the associated entries are updated to maintain the double linked list data structure.

FIGS. 13-14 illustrate application of FIG. 18. As shown in FIG. 13, in case I the list of sequences data structure includes two sequences, a first sequence 1305 containing address [7] and a second sequence 1310 containing addresses [13] and [15]. It is assumed, in each of the examples shown in FIGS. 13-14, that the gap distance is 2. If address [10] is inserted, it is more than the gap distance of 2 away from the tail address [7] of the first sequence 1305 (10−7>2) and is also more than the gap distance away from the head address of the second sequence 1310 (13−10>2). Accordingly, as shown in the right-hand side, after insertion of address [10], the list of sequences data structure 1100 includes three sequences, 1305 and 1310 which are unchanged, and a new sequence 1315 containing address [10].

In case II, initially the list of sequences data structure includes two sequences, a first sequence 1320 containing address [9] and a second sequence 1325 containing addresses [13] and [15].

If address [11] is inserted, it is less than or equal to the gap distance of 2 away from the tail address [9] of the first sequence 1305 (11−9≤2) and is also less than or equal to the gap distance away from the head address [13] of the second sequence 1325 (13−11≤2). Accordingly, as shown in the right-hand side of case II, after insertion of address [11], the previous two sequences 1320 and 1325 are concatenated with address [11] in-between, such that the list of sequences data structure includes only one sequence 1330 containing addresses [9], [11], [13], and [15].

In FIG. 14, case III, initially the list of sequences data structure 1100 includes two sequences, a first sequence 1335 containing address [9] and a second sequence 1340 containing addresses [13] and [15]. If address [10] is inserted, it is less than or equal to the gap distance of 2 away from the tail address [9] of the first sequence 1335 (10−9≤2) and is greater than the gap distance away from the head address [13] of the second sequence 1340 (13−10>2). Accordingly, insertion of address [10] will cause address [10] to be joined to the tail of the first sequence 1335, such that the list of sequences data structure 1100 after insertion of address [10] includes sequence 1345 containing addresses [9] and [10], and sequence 1340 which is unchanged.

In FIG. 14, case IV, initially the list of sequences data structure includes two sequences, a first sequence 1335 containing address [9] and a second sequence 1340 containing addresses [13] and [15]. If address [12] is inserted, it is greater than the gap distance of 2 away from the tail address [9] of the first sequence 1335 (12−9>2), and is less than the gap distance of 2 away from the head address [13] of the second sequence 1340 (13−12≤2). Accordingly, insertion of address [12] will cause address [12] to be joined to the head of the second sequence 1340, such that the list of sequences data structure 1100 after insertion of address [12] includes sequence 1335 which contains the same addresses as prior to insertion, and sequence 1350 which contains addresses [12], [13], [15]. Because insertion of address [12] causes the head address of one of the sequences to change, the pointers of the doubly linked list are updated to reflect the new head values of the entries in the list of sequences data structure 1100.

FIG. 15 is functional block diagram of the sequence lengths data structure and the histogram data structure 1250 showing four examples of how the sequence lengths data structure 1200 and histogram data structure 1250 change with insertion of an address into the list of sequences data structure 1100. The numbers included in the data structures 1200, 1250 shown in FIG. 15 correlate to the example sequences included in the list of sequences data structure 1100 shown in the examples contained in FIGS. 13 and 14.

As shown in FIG. 15, when insertion of an address causes a new sequence to be created, as in case i in FIG. 13, a new entry is created in the sequence lengths data structure 1200 associating the head address of the new sequence with the length 1. When two sequences are joined, as in case II, the length of the sequence preceding the arriving page is incremented by one plus the length of the second sequence, and the entry corresponding to the second sequence is deleted. When the length of one sequence is increased by one, as in cases III and IV of FIG. 14, only the length of the affected entries are incremented. Additionally, when the address is joined to the head of the subsequent sequence, as is the situation in case IV, the head of the sequence is updated in the sequence lengths data structure 1200 as well.

The histogram data structure 1250 is also updated in connection with an insertion operation. Every time the sequence lengths data structure 1200 changes, the histogram data structure 1250 needs to be updated. For case I, in which a new sequence is created, the only change to the histogram data structure 1250 is to increment the counter associated with sequences of length 1. For case II, in which two sequences are joined, at most three entries are updated. Specifically, the counters associated with the original lengths of the two joined sequences are decremented by one, and the counter associated with the length of the new resultant sequence is incremented by one. For cases III and IV, in which only one sequence length increases, the counter associated with the original length of the sequence that changed is decremented by 1, and the counter associated with the new sequence length is incremented by 1.

Table IV, below, shows the time complexity of computing sequentiality of an IO workload using a normal sorting process. As shown in Table IV, if a normal sorting process is used to order the address in the IO trace data structure 700, the time complexity of determining the sequences from a set of W traces is on the order of w log(w). Since w, in practical implementations, may encompass many thousands of traces, using a normal sorting process to calculate the sequentiality of the traces becomes impractical with a large data set (large W).

TABLE IV

| Step | Description | Time Complexity |
|---|---|---|
| 1 | Remove duplicate pages from window | O(w) |
| 2 | Update slice window (queue) | O(1) |
| 3 | Sort the pages of the window | O(w log(w)) |

TABLE IV-continued

| Step | Description | Time Complexity |
|---|---|---|
| 4 | Compute sequence lengths and histogram from scratch | O(w) |
| | Total complexity | O(w log(w)) |

Table 5, below, shows the time complexity for the algorithm described herein for computing the sequentiality in a I/O workload using the data structures 700, 900, 1100, 1200, 1250. As shown in table 5, using the data structures 700, 900, 1100, 1200, 1250, as described herein, enables the time complexity of determining the sequentiality of the workload on the LUN from order O(w log(w)) to order O(w). This results in a dramatic reduction in the amount of processing resources required to implement the sequentiality determination. Additionally, the sequentiality determination is only necessary when a new address is inserted into the page count data structure 900 or if the page count for an address is reduced to zero in the page count data structure 900. Accordingly, the insertion and deletion processes associated with updating data structures 1100, 1200, and 1250 are not required to be implemented in every instance, thus further adding to the computational efficiency of the described process of determining sequentiality of the workload.

TABLE 5

| Step | Description | Time Complexity |
|---|---|---|
| 1 | Insertion sort in the double linked list implementing the list of sequences data structure 1100 | O(w) |
| 2 | Update slice window contained in the IO trace data structure 700 | O(1) |
| 3 | Update page count data structure 900 | O(1) |
| 4 | Update sequence lengths data structure 1200 | O(1) |
| 5 | Update histogram data structure 1200 | O(1) |
| 6 | Remove page from double linked list implementing the list of sequences data structure 1100 | O(w) |
| | Total complexity | O(w) |

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for optimizing performance of a storage system, the storage system having a cache and a cache management system controlling operation of the cache, the method comprising the steps of:
   maintaining, by the cache management system, an IO trace data structure having a rolling window of IO traces describing access operations on addresses of a storage volume;
   maintaining, by the cache management system, a page count data structure having a list of all of the addresses of the storage volume referenced by the IO traces in the IO trace data structure;
   maintaining, by the cache management system, a list of sequences data structure containing sequences of the addresses of the storage volume referenced by the IO traces in the IO trace data structure;
   maintaining, by the cache management system, a sequence lengths data structure correlating each sequence in the list of sequences data structure with a length of the sequence; and
   maintaining, by the cache management system, a histogram data structure correlating sequence lengths and a number of how many of sequences of that length are maintained in the sequence lengths data structure; and
   adjusting a cache policy applied to the cache to adjust operation of the cache, by the cache management system, based on the content of the histogram data structure.

2. The method of claim 1, wherein the list of sequences data structure is a double linked list of the sequences of the addresses of the storage volume referenced by the IO traces in the IO trace data structure, with duplicate addresses removed.

3. The method of claim 2, wherein list of sequences data structure is an ordered list of sequences based on a head address of each sequence, and wherein each sequence other than a first sequence and last sequence, has a respective first pointer to a previous sequence in the list of sequences data structure and a respective second pointer to a subsequent sequence in the list of sequences data structure.

4. The method of claim 1, further comprising updating the IO trace data structure to remove a first IO trace from the rolling window of IO traces.

5. The method of claim 4, further comprising updating the page count data structure to decrement a page count of a first address associated with the removed first IO trace.

6. The method of claim 5, wherein when a result of decrementing the page count of the first address causes the page count for the first address to be equal to zero, the method further comprising updating the list of sequences data structure to remove the first address from a first sequence containing the first address.

7. The method of claim 6, further comprising updating the sequence lengths data structure after removing the first address from the list of sequences data structure; and updating the histogram data structure after removing the first address from the list of sequences data structure.

8. The method of claim 6, wherein when the first address is intermediate a head address of the first sequence and a tail address of the first sequence, and removal of the first address causes a pair of adjacent addresses in the sequence to be greater than a gap distance away from each other, the step of updating the list of sequences data structure comprises creating two new sequences from the first sequence.

9. The method of claim 8, wherein a first of the two new sequence includes all elements of the first sequence before the removed first address and a second of the two new sequence comprises all the elements of the first sequence after the removed first address.

10. The method of claim 1, further comprising updating the IO trace data structure to insert a second IO trace into the rolling window of IO traces.

11. The method of claim 10, further comprising updating the page count data structure to increment a page count of a second address associated with the inserted second IO trace.

12. The method of claim 11, wherein when a result of incrementing the page count of the second address causes the page count for the second address to be equal to one, the method further comprising determining a correct place to insert the second address in the list of sequences data structure.

13. The method of claim 12, wherein when the correct place to insert the second address in the list of sequences data structure is in a middle of a previous sequence contained by the list of sequences data structure, performing an insert procedure to add the second address to the previous sequence.

14. The method of claim 12, wherein when the correct place to insert the second address in the list of sequences data structure is in between two previous sequences contained by the list of sequences data structure, performing an insert procedure to add the second address as a new sequence in the list of sequences data structure.

15. The method of claim 12, further comprising updating the sequence lengths data structure after inserting the second address into the list of sequences data structure.

16. The method of claim 15, further comprising updating the histogram data structure after inserting the second address into the list of sequences data structure.

17. The method of claim 12, wherein when the correct place to insert the second address in the list of sequences data structure is at a head or tail of a first of the previous sequences contained by the list of sequences data structure, performing an insert procedure to add the second address as a new head address or new tail address of the first of the previous sequences in the list of sequences data structure.

18. The method of claim 17, wherein when the second address is inserted as the new head address of the first of the previous sequences in the list of sequences data structure, and the second address is less than a gap distance away from a tail address of a second of the previous sequences in the list of sequences data structure, the method further comprising the step of joining the first of the previous sequences and the second of the previous sequences in the list of sequences data structure.

19. The method of claim 17, wherein when the second address is inserted as the new tail address of the first of the previous sequences in the list of sequences data structure, and the second address is less than a gap distance away from a head address of a second of the previous sequences in the list of sequences data structure, the method further comprising the step of joining the first of the previous sequences and the second of the previous sequences in the list of sequences data structure.

* * * * *